(12) United States Patent
Kaye et al.

(10) Patent No.: US 8,318,368 B2
(45) Date of Patent: Nov. 27, 2012

(54) PORTABLE SYSTEMS FOR ENGINE BLOCK

(75) Inventors: Ian W. Kaye, Livermore, CA (US); Kenneth J. Newell, Livermore, CA (US)

(73) Assignee: UltraCell, L.L.C., Commack, NY (US)

( * ) Notice: Subject to any disclaimer, the term of this patent is extended or adjusted under 35 U.S.C. 154(b) by 1420 days.

(21) Appl. No.: 11/834,209

(22) Filed: Aug. 6, 2007

(65) Prior Publication Data

US 2008/0057360 A1 Mar. 6, 2008

Related U.S. Application Data

(63) Continuation-in-part of application No. 11/314,810, filed on Dec. 20, 2005, now Pat. No. 7,666,539, which is a continuation-in-part of application No. 10/877,771, filed on Jun. 25, 2004, now Pat. No. 7,763,368, application No. 11/834,209, which is a continuation-in-part of application No. 10/877,826, filed on Jun. 25, 2004, now abandoned.

(60) Provisional application No. 60/836,896, filed on Aug. 9, 2006, provisional application No. 60/836,827, filed on Aug. 9, 2006, provisional application No. 60/482,996, filed on Jun. 27, 2006, provisional application No. 60/483,416, filed on Jun. 27, 2003, provisional application No. 60/482,981, filed on Jun. 27, 2003.

(51) Int. Cl.
*H01M 8/04* (2006.01)
(52) U.S. Cl. .......................... 429/435; 429/434; 429/433
(58) Field of Classification Search .................. 429/435, 429/434, 433
See application file for complete search history.

(56) References Cited

U.S. PATENT DOCUMENTS

| | | | |
|---|---|---|---|
| 3,973,993 A | 8/1976 | Bloomfield et al. | |
| 4,128,700 A | 12/1978 | Sederquist | |
| 4,686,157 A | 8/1987 | Miyake et al. | |
| 4,737,161 A | 4/1988 | Szydlowski et al. | |
| 4,965,143 A | 10/1990 | Mizuno et al. | |
| 5,081,095 A | 1/1992 | Bedford et al. | |
| 5,248,567 A * | 9/1993 | Amemiya et al. | 429/413 |
| 5,344,721 A * | 9/1994 | Sonai et al. | 429/423 |
| 5,434,015 A | 7/1995 | Yamada et al. | |
| 5,525,436 A | 6/1996 | Savinell et al. | |

(Continued)

FOREIGN PATENT DOCUMENTS

DE 44 46 841 7/1996

(Continued)

OTHER PUBLICATIONS

Notice of Allowance dated Jan. 13, 2011 in U.S. Appl. No. 11/830,274.

(Continued)

*Primary Examiner* — Helen O Conley
(74) *Attorney, Agent, or Firm* — Keusey & Associates, P.C.

(57) ABSTRACT

Described herein are portable fuel cell systems for producing electrical energy. The portable fuel cell systems include a fuel processor including a reformer and a burner. The reformer receives fuel and outputs hydrogen using the fuel. The burner processes fuel to generate heat. The system also includes a fuel cell configured to produce electrical energy using hydrogen output by the reformer. The system also includes a heat exchanger configured to transfer heat generated in the fuel cell or generated in the fuel processor to a reactant fluid.

6 Claims, 16 Drawing Sheets

U.S. PATENT DOCUMENTS

| | | | |
|---|---|---|---|
| 5,534,328 | A | 7/1996 | Ashmead et al. |
| 5,601,938 | A | 2/1997 | Mayer et al. |
| 5,611,214 | A | 3/1997 | Wegeng et al. |
| 5,641,585 | A | 6/1997 | Lessing et al. |
| 5,716,727 | A | 2/1998 | Savinell et al. |
| 5,789,093 | A | 8/1998 | Malhi |
| 5,811,062 | A | 9/1998 | Wegeng et al. |
| 5,961,930 | A | 10/1999 | Chatterjee et al. |
| 5,961,932 | A | 10/1999 | Ghosh et al. |
| 6,077,620 | A | 6/2000 | Pettit |
| 6,080,501 | A | 6/2000 | Kelley et al. |
| 6,103,411 | A | 8/2000 | Matsubayashi et al. |
| 6,193,501 | B1 | 2/2001 | Masel et al. |
| 6,200,536 | B1 | 3/2001 | Tonkovich et al. |
| 6,235,983 | B1 | 5/2001 | Becker |
| 6,245,214 | B1 | 6/2001 | Rehg et al. |
| 6,268,077 | B1 | 7/2001 | Kelley et al. |
| 6,312,846 | B1 | 11/2001 | Marsh |
| 6,406,808 | B1 | 6/2002 | Pratt et al. |
| 6,410,175 | B1 | 6/2002 | Tillmetz et al. |
| 6,415,860 | B1 | 7/2002 | Kelly et al. |
| 6,423,434 | B1 | 7/2002 | Pratt et al. |
| 6,460,733 | B2 | 10/2002 | Acker et al. |
| 6,465,119 | B1 | 10/2002 | Koripella et al. |
| 6,470,569 | B1 | 10/2002 | Lippert et al. |
| 6,537,506 | B1 | 3/2003 | Schwalbe et al. |
| 6,541,676 | B1 | 4/2003 | Franz et al. |
| 6,569,550 | B2 | 5/2003 | Khelifa |
| 6,569,553 | B1 | 5/2003 | Koripella et al. |
| 6,638,654 | B2 | 10/2003 | Jankowksi et al. |
| 6,673,130 | B2 | 1/2004 | Jankowski et al. |
| 6,753,036 | B2 | 6/2004 | Jankowski et al. |
| 6,777,116 | B1 | 8/2004 | Muller et al. |
| 6,821,666 | B2 | 11/2004 | Morse et al. |
| 6,866,951 | B2 | 3/2005 | Foley et al. |
| 6,913,998 | B2 | 7/2005 | Jankowski |
| 6,921,603 | B2 | 7/2005 | Morse |
| 6,939,632 | B2 | 9/2005 | Arana et al. |
| 6,960,235 | B2 | 11/2005 | Morse |
| 6,960,403 | B2 | 11/2005 | Morse |
| 6,977,002 | B2 | 12/2005 | Takimoto et al. |
| 7,122,261 | B2 | 10/2006 | Morse |
| 7,186,352 | B2 | 3/2007 | Morse |
| 7,189,471 | B2 | 3/2007 | Jankowksi |
| 2001/0008718 | A1 | 7/2001 | Kobayashi |
| 2001/0016275 | A1 | 8/2001 | Takamura |
| 2001/0028968 | A1 | 10/2001 | Griesneier |
| 2001/0029974 | A1 | 10/2001 | Cohen et al. |
| 2002/0012825 | A1 | 1/2002 | Sasahara et al. |
| 2002/0028366 | A1 | 3/2002 | Haltiner |
| 2002/0045082 | A1 | 4/2002 | Marsh |
| 2002/0068203 | A1 | 6/2002 | Hiyoshi et al. |
| 2002/0071972 | A1 | 6/2002 | Gebhardt et al. |
| 2002/0076599 | A1 | 6/2002 | Neutzler et al. |
| 2002/0081468 | A1 | 6/2002 | Shioya |
| 2002/0094462 | A1 | 7/2002 | Shioya et al. |
| 2002/0098119 | A1 | 7/2002 | Goodman |
| 2002/0102451 | A1 | 8/2002 | Acker et al. |
| 2002/0106540 | A1 | 8/2002 | Shioya |
| 2002/0127141 | A1 | 9/2002 | Acker |
| 2002/0131915 | A1 | 9/2002 | Shore et al. |
| 2002/0132156 | A1 | 9/2002 | Ruhl et al. |
| 2002/0147107 | A1 | 10/2002 | Abdo et al. |
| 2002/0150804 | A1 | 10/2002 | Srinivasan et al. |
| 2002/0155335 | A1 | 10/2002 | Kearl |
| 2002/0192537 | A1 | 12/2002 | Ren |
| 2003/0006668 | A1 | 1/2003 | Lal et al. |
| 2003/0027022 | A1 | 2/2003 | Arana et al. |
| 2003/0031910 | A1 | 2/2003 | Satou et al. |
| 2003/0031913 | A1 | 2/2003 | Pavio et al. |
| 2003/0057199 | A1 | 3/2003 | Villa et al. |
| 2003/0082422 | A1 | 5/2003 | Koschany |
| 2003/0082423 | A1 | 5/2003 | Kushibiki et al. |
| 2003/0091502 | A1 | 5/2003 | Holladay et al. |
| 2003/0103878 | A1 | 6/2003 | Morse |
| 2003/0129462 | A1 | 7/2003 | Yang et al. |
| 2003/0129464 | A1 | 7/2003 | Becerra et al. |
| 2003/0138681 | A1 | 7/2003 | Boneberg et al. |
| 2003/0165728 | A1 | 9/2003 | Meguriya et al. |
| 2003/0194363 | A1 | 10/2003 | Koripella |
| 2003/0198844 | A1 | 10/2003 | Ukai et al. |
| 2003/0235732 | A1 | 12/2003 | Haltiner, Jr. |
| 2004/0009381 | A1 | 1/2004 | Sakai et al. |
| 2004/0043273 | A1 | 3/2004 | Jankowksi |
| 2004/0048128 | A1 | 3/2004 | Jankowksi |
| 2004/0062961 | A1 | 4/2004 | Sato et al. |
| 2004/0076861 | A1 | 4/2004 | Mann et al. |
| 2004/0137309 | A1 | 7/2004 | Allen et al. |
| 2004/0166385 | A1 | 8/2004 | Morse |
| 2004/0166395 | A1 | 8/2004 | Jankowski |
| 2004/0197610 | A1 | 10/2004 | Drunert |
| 2004/0211054 | A1 | 10/2004 | Morse |
| 2005/0008909 | A1 | 1/2005 | Kaye |
| 2005/0008911 | A1 | 1/2005 | Kaye |
| 2005/0011125 | A1 | 1/2005 | Kaye |
| 2005/0014040 | A1 | 1/2005 | Kaye |
| 2005/0014059 | A1 | 1/2005 | Kaye |
| 2005/0186455 | A1 | 8/2005 | Kaye |
| 2005/0244685 | A1 | 11/2005 | Kim et al. |
| 2006/0024543 | A1 | 2/2006 | Kaye et al. |

FOREIGN PATENT DOCUMENTS

| | | |
|---|---|---|
| DE | 19841993 | 3/2000 |
| GB | 002405744 | 3/2005 |
| JP | 62 066578 | 3/1987 |
| JP | 02 139871 | 5/1990 |
| JP | 10-162842 | 6/1998 |
| WO | WO 00/45457 | 8/2000 |
| WO | WO 02/059993 | 8/2002 |
| WO | WO 02/093665 | 11/2002 |
| WO | WO 02/103832 | 12/2002 |
| WO | WO 02/103878 | 12/2002 |
| WO | WO 2004/030805 | 4/2004 |

OTHER PUBLICATIONS

Office Action dated Dec. 30, 2010 in U.S. Appl. No. 12/344,077.
Office Action dated Jul. 29, 2010 in U.S. Appl. No. 10/877,769.
Notice of Allowance dated Jun. 15, 2010 in U.S. Appl. No. 10/877,771.
Office Action dated Mar. 26, 2010 in U.S. Appl. No. 10/877,769.
Notice of Allowance dated Oct. 28, 2009 in U.S. Appl. No. 11/314,810.
Office Action dated Sep. 18, 2009 in U.S. Appl. No. 10/877,769.
Office Action dated Feb. 24, 2009 in U.S. Appl. No. 11/830,669.
Office Action dated Dec. 9, 2008 in U.S. Appl. No. 10/877,769.
Chinese Office Action dated Feb. 13, 2009 from CN Patent Application No. 200480024524.9.
Indian Examination Report dated Dec. 22, 2008 from IN Patent Application No. 013/KOLNP/2005.
Office Action dated Mar. 24, 2009 in U.S. Appl. No. 11/314,810.
Office Action dated Feb. 5, 2009 in U.S. Appl. No. 11/829,932.
U.S. Office Action dated May 1, 2009 in U.S. Appl. No. 10/877,769.
Supplemental European Search Report dated Oct. 29, 2009 in European Patent Application No. 04756161.8.
Chinese Office Action dated Jun. 20, 2008 from Chinese Patent Application No. 200480024523.4.
Office Action dated Feb. 24, 2008 in U.S. Appl. No. 11/830,669.
International Search Report dated Apr. 2, 2008 from PCT Application No. PCT/US05/46423.
Written Opinion dated Apr. 2, 2008 from PCT Application No. PCT/US05/46423.
Office Action dated Aug. 5, 2008 from U.S. Appl. No. 11/830,669.
Chinese Office Action dated Jul. 18, 2008 from CN Patent Application No. 200480024524.9.
Office Action dated Jun. 16, 2008 from U.S. Appl. No. 10/877,769.
International Search Report dated Aug. 5, 2008 from PCT Application No. PCT/US07/17579.
Written Opinion dated Aug. 5, 2008 from PCT Application No. PCT/US07/17579.
Office Action dated Jun. 6, 2008 from U.S. Appl. No. 11/829,932.
International Search Report dated Apr. 8, 2005 for PCT Application No. PCT/US2004/020517.

Written Opinion dated Apr. 8, 2005 for PCT Application No. PCT/US2004/020517.
Office Action dated Mar. 10, 2005 from U.S. Appl. No. 10/877,771.
Office Action dated Aug. 24, 2005 from U.S. Appl. No. 10/877,771.
Office Action dated Feb. 23, 2006 from U.S. Appl. No. 10/877,771.
Office Action dated Jul. 3, 2006 from U.S. Appl. No. 10/877,771.
Office Action dated Oct. 11, 2006 from U.S. Appl. No. 10/877,771.
Chinese Office Action dated Nov. 6, 2007 from CN Patent Application No. 200480024524.9.
Shankara Narayanan K.R. , "What is a Heat Pipe", http://www.cheresources.com/htpipes.shtml.
S. Ahmed et al., "Catalytic Partial Oxidation Reforming of Hydrocarbon Fuels", Nov. 16-19, 1998, 1998 Fuel Cell Seminar, Palm Springs, CA.
A.R. Boccaccini et al., "Electrophoretic Deposition of Nanoceramic Particles onto Electrically Conducting Fibre Fabrics", Sep. 21-24, 1998, $43^{rd}$ International Scientific Colloquium, Technical University of Ilmenau.
J. Bostaph et al., "1W Direct Methanol Fuel Cell System as a Desktop Charger", Oct. 14, 2002, Motorola Labs, Tempe, AZ.
K. Brooks et al., "Microchannel Fuel Processing, Fuel Cells for Transportation/Fuels for Fuel Cells", May 6-10, 2002, 2002 Annual Program/Lab R&D Review, Pacific Northwest National Laboratory.
M.J. Castaldi et al., "A Compact, Lightweight, Fast-Response Preferential Oxidation Reactor for PEM Automotive Fuel Cell Applications", Sep. 6, 2002, Precision Combustion, Inc., North Haven, CT.
S. Ehrenberg et al., "One Piece Bi-Polar (OPB) Plate with Cold Plate Cooling", Dec. 13, 2002, Session PEM R&D II (2A), Dais Analytic—Rogers.
T.M. Floyd et al., "Liquid-Phase and Multi-Phase Microreactors for Chemical Synthesis", Jun. 1999, Massachusetts Institute of Technology, Cambridge, MA.
A.J. Franz et al., "High Temperature Gas Phase Catalytic and Membrane Reactors", Jun. 1999, Massachusetts Institute of Technology, Cambridge, MA.
J.D. Holladay et al., "Miniature Fuel Processors for Portable Fuel Cell Power Supplies", Nov. 26, 2002, Battelle Pacific Northwest Division, Richland, WA.
S.W. Janson et al., "MEMS, Microengineering and Aerospace Systems", 1999, The American Institute of Aeronautics and Astronautics, Inc.
J. Kaschmitter et al., "Micro-Fabricated Methanol/Water Reformers for Small PEM Fuel Cell Systems", Jul. 21-24, 2003, $8^{th}$ Electrochemical Power Sources R&D Symposium, Portsmouth, VA.
K. Keegan et al., "Analysis for a Planar Solid Oxide Fuel Cell Based Automotive Auxiliary Power Unit", Mar. 4-7, 2002, SAE 2002 World Congress, Detroit, MI.
K. Kempa et al., "Photonic Crystals Based on Periodic Arrays of Aligned Carbon Nanotubes", Oct. 3, 2002, Nano Letters 2003, vol. 3. No. 1, 13-18.
R. Kumar et al., "Solid Oxide Fuel Cell Research at Argonne National Laboratory", Mar. 29-30, 2001, $2^{nd}$ Solid Sate Energy Conversion Alliance Workshop, Arlington, VA.
S.H. Lee et al., "Removal of Carbon Monoxide from Reformate for Polymer Electrolyte Fuel Cell Application", Nov. 16-19, 1998, 1998 Fuel Cell Seminar, Palm Springs, CA.
Q. Li et al., "The CO Poisoning Effect in PEMFCs Operational at Temperatures up to 200° C.", 2003, Journal of the Electrochemical Society, 150 (12) A1599-A1605.

D. Myers et al., "Alternative Water-Gas Shift Catalysts", Jun. 7-8, 2000, 2000 Annual National Laboratory R&D Meeting, DOE Fuel Cells for Transportation Program, Argonne National Laboratory.
D.R. Palo et al., "Development of a Soldier-Portable Fuel Cell Power System, Part I: A Bread-Board Methanol Fuel Processor", 2002, Journal of Power Sources 108 (2002) 28-34.
A. Pattekar et al., "A Microreactor for In-situ Hydrogen Production by Catalytic Methanol Reforming", May 27-30, 2001, Proceedings of the $5^{th}$ International Conference on Microreaction Technology.
A. Pattekar et al., "Novel Microfluidic Interconnectors for High Temperature and Pressure Applications", 2003, Journal of Micromechanics and Microengineering, 13, 337-345.
D. Prater et al., "Systematic Examination of a Direct Methanol-Hydrogen Peroxide Fuel Cell", Sep. 22, 2001, Swift Enterprises, Ltd., Lafayette, IN.
W. Ruettinger et al., "A New Generation of Water Gas Shift Catalysts for Fuel Cell Applications", 2003, Journal of Power Sources, 118, 61-65.
O. Savadogo et al., Hydrogen/Oxygen Polymer Electrolyte Membrane Fuel Cell (PEMFC) Based on Acid-Doped Polybenzimidazole (PBI), 2000, Journal of New Materials for Electrochemical Systems, 3, 345-349.
R.F. Savinell et al., "High Temperature Polymer Electrolyte for PEM Fuel Cells", Sep. 4, 2002, Department of Chemical Engineering, Case Western Reserve University.
R. Srinivasan et al., "Micromachined Reactors for Catalytic Partial Oxidation Reactions", Nov. 1997, AIChe Journal, vol. 43, No. 11, 3059-3069.
S. Swartz et al., "Ceria-Based Water-Gas-Shift Catalysts", Aug. 1, 2003, NexTech Materials, Ltd., Wolrthington, OH.
S. Tasic et al., "Multilayer Ceramic Processing of Microreactor Systems", Oct. 14, 2002, Motorola Labs, Tempe, AZ.
V. Tomašić et al., "Development of the Structured Catalysts for the Exhaust Gas Treatment", 2001, Chem. Biochem. Eng. Q. 15 (3), 109-115.
Tiax LLC, "Advanced Hydrogen Storage: A System's Perspective and Some Thoughts on Fundamentals", Aug. 14-15, 2002, Presentation for DOE Workshop on Hydrogen Storage, Cambridge, MA.
Wan et al., "Catalyst Preparation: Catalytic Converter", Feb. 19, 2003, www.insightcentral.net/encatalytic.html.
J. Zalc et al., "Are Noble Metal-Based Water-Gas Shift Catalysts Practical for Automotive Fuel Processing?", 2002, Journal of Catalysis, 206, 169-171.
J. Zizelman et al., "Solid-Oxide Fuel Cell Auxiliary Power Unit: A Paradigm Shift in Electric Supply for Transportation", undated, Delphi Automotive Systems.
"Methanol-Powered Laptops—Cleared for Take-Off", www.siiicon.com, Oct. 7, 2002.
Melissa Funk, "Methanol Fuel Quality Specification Study for Proton Exchange Membrane Fuel Cells, Final Report", XCELLSIS, Feb. 2002, 65 pages.
Dr. Detlef zur Megede et al., "MFCA Research Document, Complete", Methanol Fuel Cell Alliance, Sep. 2000, 242 pages.
Office Action dated Sep. 28, 2007 from Chinese Patent Application No. 200480024524.9.
Chinese Office Action dated Jun. 20, 2008 from CN Patent Application No. 200480024523.4.

* cited by examiner

PORTABLE SYSTEMS FOR ENGINE BLOCK

CROSS-REFERENCE TO RELATED APPLICATIONS

This application a) claims priority under 35 U.S.C. §119(e) to i) U.S. Provisional Patent Application No. 60/836,896 filed on Aug. 9, 2006 and to ii) U.S. Provisional Patent Application No. 60/836,827 filed on Aug. 9, 2006; b) is a continuation-in-part and claims priority under 35 U.S.C. §120 to co-pending U.S. patent application Ser. No. 11/314,810, filed Dec. 20, 2005 and entitled, "HEAT EFFICIENT PORTABLE CELL SYSTEMS", this Ser. No. 11/314,810 Application was a continuation-in-part and claimed priority under 35 U.S.C. §120 to co-pending U.S. patent application Ser. No. 10/877,771, filed Jun. 25, 2004 and entitled, "EFFICIENT MICRO FUEL CELL SYSTEMS AND METHODS", which claimed priority under 35 U.S.C. §119(e) from i) U.S. Provisional Patent Application No. 60/482,996 filed on Jun. 27, 2003, ii) U.S. Provisional Patent Application No. 60/483,416 and filed on Jun. 27, 2003, and iii) U.S. Provisional Patent Application No. 60/482,981 and filed on Jun. 27, 2003; and c) is a continuation-in-part and claims priority under 35 U.S.C. §120 to co-pending U.S. patent application Ser. No. 10/877,826, filed Jun. 25, 2004 and entitled, "FUEL PREHEAT IN FUEL CELLS AND PORTABLE ELECTRONICS", which claimed priority under 35 U.S.C. §119(e) from i) U.S. Provisional Patent Application No. 60/482,996 filed on Jun. 27, 2003, ii) U.S. Provisional Patent Application No. 60/483,416 and filed on Jun. 27, 2003, and iii) U.S. Provisional Patent Application No. 60/482,981 and filed on Jun. 27, 2003; each of the above mentioned patent applications is incorporated by reference herein for all purposes.

FIELD OF THE INVENTION

The present invention relates to electrical energy generation technology. In particular, the invention relates to portable fuel cell systems and methods for operating a portable fuel cell system.

BACKGROUND

Consumer, military and industrial ruggedized portable electronics devices and other portable electrical applications still mainly rely on lithium ion and other battery technologies. Conventional batteries are heavy relative to their energy capacity. Portable fuel cell systems, however, offer higher energy densities, particularly when they use a liquid fuel.

The portability constrains fuel cell system design and adds challenging design criteria such as weight, space, and managing elevated fuel cell system temperatures while adhering to portable electronics device skin temperature standards. Thermally active electrochemical power generation in a portable package thus presents a complex series of interweaving technical problems; a solution for one problem is often in conflict with one or more others. For example, adding a pump to a stationary fuel cell system represents a trivial addition to total weight and total power consumption. Adding a pump to a portable system, however, can add as much as ten percent to the total weight and total power consumption. As another example, in a portable reformed methanol fuel cell system, fuel cell performance improves through the use of a higher operating temperature fuel cell; yet the higher operating temperature threatens to increase the surface temperature of a packaged system, resulting in the requirement to use added thermal packaging and heat management, which increases size, weight and potentially energy. Techniques that increase the viability, cost effectiveness, noise reduction and efficiency of portable fuel cell systems are desirable.

SUMMARY

In one aspect, the present invention relates to a portable fuel cell system for producing electrical energy. The portable fuel cell system includes a fuel processor that includes a reformer and a burner. The reformer receives fuel and outputs hydrogen generated from the fuel. The burner processes fuel to generate heat. The system also includes a fuel cell configured to produce electrical energy using hydrogen generated by the reformer. The system further includes at least one line, internal to the portable package, configured to transport reformer fuel to the reformer. The system additionally includes at least one line, internal to the portable package, configured to transport burner fuel to the burner. The system also includes a heat exchanger configured to transfer heat generated in the fuel cell or generated in the fuel processor to the reformer fuel or to the burner fuel.

In another aspect, the present invention relates to a method for producing electrical energy in a portable package. The method includes providing fuel to a burner in a fuel processor and generating heat in the burner using the fuel. The method also includes providing fuel to a reformer in the fuel processor, and reforming the fuel provided to the reformer to produce hydrogen. The method further includes generating electrical energy in a fuel cell using hydrogen produced by the fuel processor. The method additionally includes generating heat in the fuel cell. The method also includes providing heat generated in the fuel cell or generated in the fuel processor to: a) incoming reformer fuel in at least one line, internal to the portable package, that transports the incoming reformer fuel to the reformer, or b) incoming burner fuel in at least one line, internal to the portable package, that transports the incoming burner fuel to the burner.

In yet another aspect, the present invention relates to a method of operating a fuel cell system. The method includes providing fuel to a burner in a fuel processor, and heating the fuel initially provided to the burner. The method also includes generating heat in the burner using the heated fuel, providing a first portion of the heat generated in the burner to a reformer in the fuel processor, and providing a second portion of the heat generated in the burner to a fuel cell. The method further includes providing fuel to the reformer in the fuel processor. The method additionally includes reforming the fuel provided to the reformer to produce hydrogen. The method also includes generating electrical energy in the fuel cell using hydrogen produced by the fuel processor.

In still another aspect, the present invention relates to a method of producing electrical energy in a portable package. The electrical energy is produced in the fuel cell powers a load in less than about twelve minutes after heating fuel initially provided to a burner in the fuel cell system.

In another aspect, the present invention relates to a method of producing between about 5 watts and about 60 watts of electrical energy in a portable package. The electrical energy is produced in the fuel cell in less than about twelve minutes after heating fuel initially provided to a burner in the fuel cell system. The ambient environment outside the portable package is less than about zero degrees Celsius when the fuel is provided to burner.

In yet another aspect, the present invention relates to a method for producing electrical energy in a portable package that contains a fuel cell and a fuel processor. The method includes providing fuel to a burner in the fuel processor, and generating heat in the burner using the fuel. The method also includes providing fuel to a reformer in the fuel processor and reforming the fuel provided to the reformer to produce hydrogen. The method further includes generating electrical energy in a fuel cell using hydrogen produced by the fuel processor. The method additionally includes cooling exhaust output by the burner by transferring heat from the burner exhaust to: a) incoming reformer fuel in at least one line, internal to the portable package, that transports the incoming reformer fuel to the reformer, b) incoming burner fuel in at least one line, internal to the portable package, that transports the incoming burner fuel to the burner or c) incoming burner air in at least one line, internal to the portable package, that transports the incoming burner air feed to the burner.

In still another aspect, the present invention relates to logic encoded in one or more tangible media for execution and, when executed, operable to control or operate a fuel cell system according to one or more of the methods described herein.

In another aspect, the present invention relates to a portable fuel cell system for producing electrical energy. The portable fuel cell system includes a fuel processor that includes a reformer configured to receive fuel and to output hydrogen using the fuel, and a burner configured to process fuel to generate heat. The portable system also includes a fuel cell configured to produce electrical energy using hydrogen output by the reformer. The portable system further includes a first low pressure source configured to provide air to a cathode in the fuel cell, a second low pressure source configured to provide air to the burner in the fuel processor, and a third low pressure source configured to provide air to cool the fuel cell. The first, second and third low pressure sources provide less than about 50 Pa.

These and other features of the present invention will be described in the following description of the invention and associated figures.

DETAILED DESCRIPTION OF THE PREFERRED EMBODIMENTS

The present invention is described in detail with reference to several embodiments as illustrated in the accompanying drawings. In the following description, numerous specific details are set forth in order to provide a thorough understanding of the present invention. It will be apparent, however, to one skilled in the art, that the present invention may be practiced without some or all of these specific details. In other instances, well known process steps and/or structures have not been described in detail in order to not unnecessarily obscure the present invention.

Described herein are portable fuel cell systems that improve thermal efficiency, reduce start-up times, reduce heat losses, reduce exhaust temperatures, and/or allow the use of low pressure air and fuel movers—while navigating the design complexities of portable fuel cell systems, such as the effects of these improvements on other systems parameters such as size, weight, noise, emissions, cost, etc.

Fuel Cell Systems

Figure 1A:
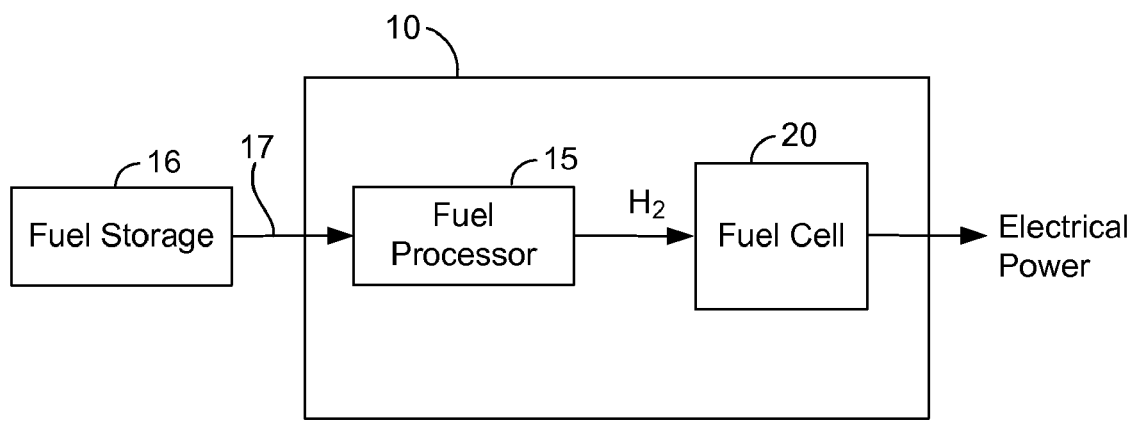
FIG. 1A illustrates a fuel cell package in accordance with one embodiment.

Fuel cell systems that benefit from embodiments described herein will first be described. FIG. 1A illustrates a fuel cell system 10 for producing electrical energy in accordance with one embodiment. As shown, 'reformed' hydrogen system 10 includes a fuel processor 15 and fuel cell 20, with a fuel storage device 16 coupled to system 10 for fuel provision. System 10 processes a fuel 17 to produce hydrogen for fuel cell 20. The system may be included in a portable electronics device such as a portable generator, a battery charger, portable computer, a hybrid energy storage device such as a fuel cell/battery combination device, and thus include controls and components to operate the device.

Storage device, or cartridge, 16 stores a fuel 17, and may comprise a refillable and/or disposable device. Either design permits recharging capability for system 10 or an electronics device using the output electrical power by swapping a depleted cartridge for one with fuel. A connector on cartridge 16 interfaces with a mating connector on system 10 or the electronics device to permit fuel transfer from the cartridge. In a specific embodiment, cartridge 16 includes a bladder that contains the fuel 17 and conforms to the volume of fuel in the bladder. An outer rigid housing of device 16 provides mechanical protection for the bladder. The bladder and housing permit a wide range of cartridge sizes with fuel capacities ranging from a few milliliters to several liters. In one embodiment, the cartridge is vented and includes a small hole, single direction flow valve, hydrophobic filter, or other aperture to allow air to enter the fuel cartridge as fuel 17 is consumed and displaced from the cartridge. In another specific embodiment, the cartridge includes 'smarts', or a digital memory used to store information related to usage of device 16.

A pressure source moves fuel 17 from storage device 16 to fuel processor 15. In a specific embodiment, a pump in system 10 draws fuel from the storage device. Cartridge 16 may also be pressurized with a pressure source such as compressible foam, spring, or a propellant internal to the housing that pushes on the bladder (e.g., propane, DME, liquid carbon dioxide or compressed nitrogen gas). In this case, a control valve in system 10 regulates fuel flow. Other fuel cartridge designs suitable for use herein may include a wick that moves a liquid fuel from within cartridge 16 to a cartridge exit. If system 10 is load following, then a sensor meters fuel delivery to processor 15, and a control system in communication with the sensor regulates the fuel flow rate as determined by a desired power level output of fuel cell 20.

Fuel 17 acts as a carrier for hydrogen and can be processed or manipulated to separate hydrogen. The terms 'fuel', 'fuel source' and 'hydrogen fuel source' are interchangeable herein and all refer to any fluid (liquid or gas) that can be manipulated to separate hydrogen. Liquid fuels 17 offer high energy densities and the ability to be readily stored and shipped. Fuel 17 may include any hydrogen bearing fuel stream, hydrocarbon fuel or other source of hydrogen such as ammonia. Currently available hydrocarbon fuels 17 suitable for use with system 10 include gasoline, diesel, JP8, JP5, $C_1$ to $C_4$ hydrocarbons, their oxygenated analogues and/or their combinations, for example. Other fuel sources may be used with system 10, such as sodium borohydride. Several hydrocarbon and ammonia products may also be used.

Fuel 17 may be stored as a fuel mixture. When the fuel processor 15 comprises a steam reformer, for example, storage device 16 includes a fuel mixture of a hydrocarbon fuel and water. Hydrocarbon fuel/water mixtures are frequently represented as a percentage of fuel in water. In one embodiment, fuel 17 comprises methanol or ethanol concentrations in water in the range of 1-99.9%. Other liquid fuels such as butane, propane, gasoline, military grade "JP8", etc. may also be contained in storage device 16 with concentrations in water from 5-100%. In a specific embodiment, fuel 17 comprises 67% methanol by volume. In a another specific embodiment, fuel 17 comprises pure methanol.

Fuel processor 15 receives methanol 17 and outputs hydrogen. In one embodiment, a hydrocarbon fuel processor 15 heats and processes a hydrocarbon fuel 17 in the presence of a catalyst to produce hydrogen. Fuel processor 15 comprises a reformer, which is a catalytic device that converts a liquid or gaseous hydrocarbon fuel 17 into hydrogen and carbon dioxide. Those of skill in the art will understand that the fuel may be mixed with air in an catalytic partial oxidizer (CPOX), or additional steam added and the reactants fed into an auto thermal reformer (ATR). As the term is used herein, reforming refers to the process of producing hydrogen from a fuel 17. Fuel processor 15 may output either pure hydrogen or a hydrogen-bearing gas stream (also commonly referred to as 'reformate').

Various types of reformers are suitable for use in fuel cell system 10; these include steam reformers, auto thermal reformers (ATR) and catalytic partial oxidizers (CPOX) for example. A steam reformer only needs steam and fuel to produce hydrogen. ATR and CPOX reformers mix air with a fuel/steam mixture. ATR and CPOX systems reform fuels such as methanol, diesel, regular unleaded gasoline and other hydrocarbons. In a specific embodiment, storage device 16 provides methanol 17 to fuel processor 15, which reforms the methanol at about 280 degrees Celsius or less and allows fuel cell system 10 usage in low temperature applications.

Fuel cell 20 electrochemically converts hydrogen and oxygen to water, generating electrical energy (and sometimes heat) in the process. Ambient air readily supplies oxygen. A pure or direct oxygen source may also be used. The water often forms as a vapor, depending on the temperature of fuel cell 20. For some fuel cells, the electrochemical reaction may also produce carbon dioxide as a byproduct.

In one embodiment, fuel cell 20 is a low volume ion conductive membrane (PEM) fuel cell suitable for use with portable applications and consumer electronics. A PEM fuel cell comprises a membrane electrode assembly (MEA) that carries out the electrical energy generating an electrochemical reaction. The MEA includes a hydrogen catalyst, an oxygen catalyst, and an ion conductive membrane that a) selectively conducts protons and b) electrically isolates the hydrogen catalyst from the oxygen catalyst. One suitable MEA is model number CELTEC P1000 as provided by BASF Fuel Cells of Frankfurt, Germany A hydrogen gas distribution layer may also be included; it contains the hydrogen catalyst and allows the diffusion of hydrogen therethrough. An oxygen gas distribution layer contains the oxygen catalyst and allows the diffusion of oxygen and hydrogen protons therethrough. Typically, the ion conductive membrane separates the hydrogen and oxygen gas distribution layers. In chemical terms, the anode comprises the hydrogen gas distribution layer and hydrogen catalyst, while the cathode comprises the oxygen gas distribution layer and oxygen catalyst.

In one embodiment, a PEM fuel cell includes a fuel cell stack having a set of bi-polar plates. In a specific embodiment, each bi-polar plate is formed from a thin single sheet of metal that includes channel fields on opposite surfaces of the metal sheet. Thickness for these plates is typically below about 5 millimeters, and compact fuel cells for portable applications may employ plates thinner than about 2 millimeters. In a specific embodiment, the thickness of the bi-polar plate is less that 0.5 millimeters. The single bi-polar plate thus dually distributes hydrogen and oxygen; one channel field distributes hydrogen while a channel field on the opposite surface distributes oxygen. In another embodiment, each bi-polar plate is formed from multiple layers that include more than one sheet of metal. Multiple bi-polar plates can be stacked to produce the 'fuel cell stack' in which a membrane electrode assembly is disposed between each pair of adjacent bi-polar plates. Gaseous hydrogen distribution to the hydrogen gas distribution layer in the MEA occurs via a channel field on one plate while oxygen distribution to the oxygen gas distribution layer in the MES occurs via a channel field on a second plate on the other surface of the membrane electrode assembly.

In electrical terms, the anode includes the hydrogen gas distribution layer, hydrogen catalyst and a bi-polar plate. The anode acts as the negative electrode for fuel cell 20 and conducts electrons that are freed from hydrogen molecules so that they can be used externally, e.g., to power an external circuit or stored in a battery. In electrical terms, the cathode includes the oxygen gas distribution layer, oxygen catalyst and an adjacent bi-polar plate. The cathode represents the positive electrode for fuel cell 20 and conducts the electrons back from the external electrical circuit to the oxygen catalyst, where they can recombine with hydrogen ions and oxygen to form water.

In a fuel cell stack, the assembled bi-polar plates are connected in series to add electrical potential gained in each layer of the stack. The term 'bi-polar' refers electrically to a bi-polar plate (whether mechanically comprised of one plate or two plates) sandwiched between two membrane electrode assembly layers. In a stack where plates are connected in series, a bi-polar plate acts as both a negative terminal for one adjacent (e.g., above) membrane electrode assembly and a positive terminal for a second adjacent (e.g., below) membrane electrode assembly arranged on the opposite surface of the bi-polar plate.

In a PEM fuel cell, the hydrogen catalyst separates the hydrogen into protons and electrons. The ion conductive membrane blocks the electrons, and electrically isolates the chemical anode (hydrogen gas distribution layer and hydrogen catalyst) from the chemical cathode. The ion conductive membrane also selectively conducts positively charged ions. Electrically, the anode conducts electrons to a load (electrical energy is produced) or battery (energy is stored). Meanwhile, protons move through the ion conductive membrane. The protons and used electrons subsequently meet on the cathode side, and combine with oxygen to form water. The oxygen catalyst in the oxygen gas distribution layer facilitates this reaction. One common oxygen catalyst comprises platinum powder thinly coated onto a carbon paper or cloth. Many designs employ a rough and porous catalyst to increase surface area of the platinum exposed to the hydrogen and oxygen. A fuel cell suitable for use herein is further described in commonly owned patent application Ser. No. 11/120,643 and entitled "Compact Fuel Cell Package", which is incorporated by reference in its entirety for all purposes.

Since the electrical generation process in fuel cell 20 is exothermic, fuel cell 20 may implement a thermal management system to dissipate heat. Fuel cell 20 may also employ a number of humidification plates (HP) to manage moisture levels in the fuel cell.

While system 10 will mainly be discussed with respect to PEM fuel cells, it is understood that system 10 may be practiced with other fuel cell architectures. The main difference between fuel cell architectures is the type of ion conductive membrane used. In another embodiment, fuel cell 20 is phosphoric acid fuel cell that employs liquid phosphoric acid for ion exchange. Solid oxide fuel cells employ a hard, nonporous ceramic compound for ion exchange and may be suitable for use with embodiments described herein. Other suitable fuel cell architectures may include alkaline and molten carbonate fuel cells, for example.

Figure 1B:
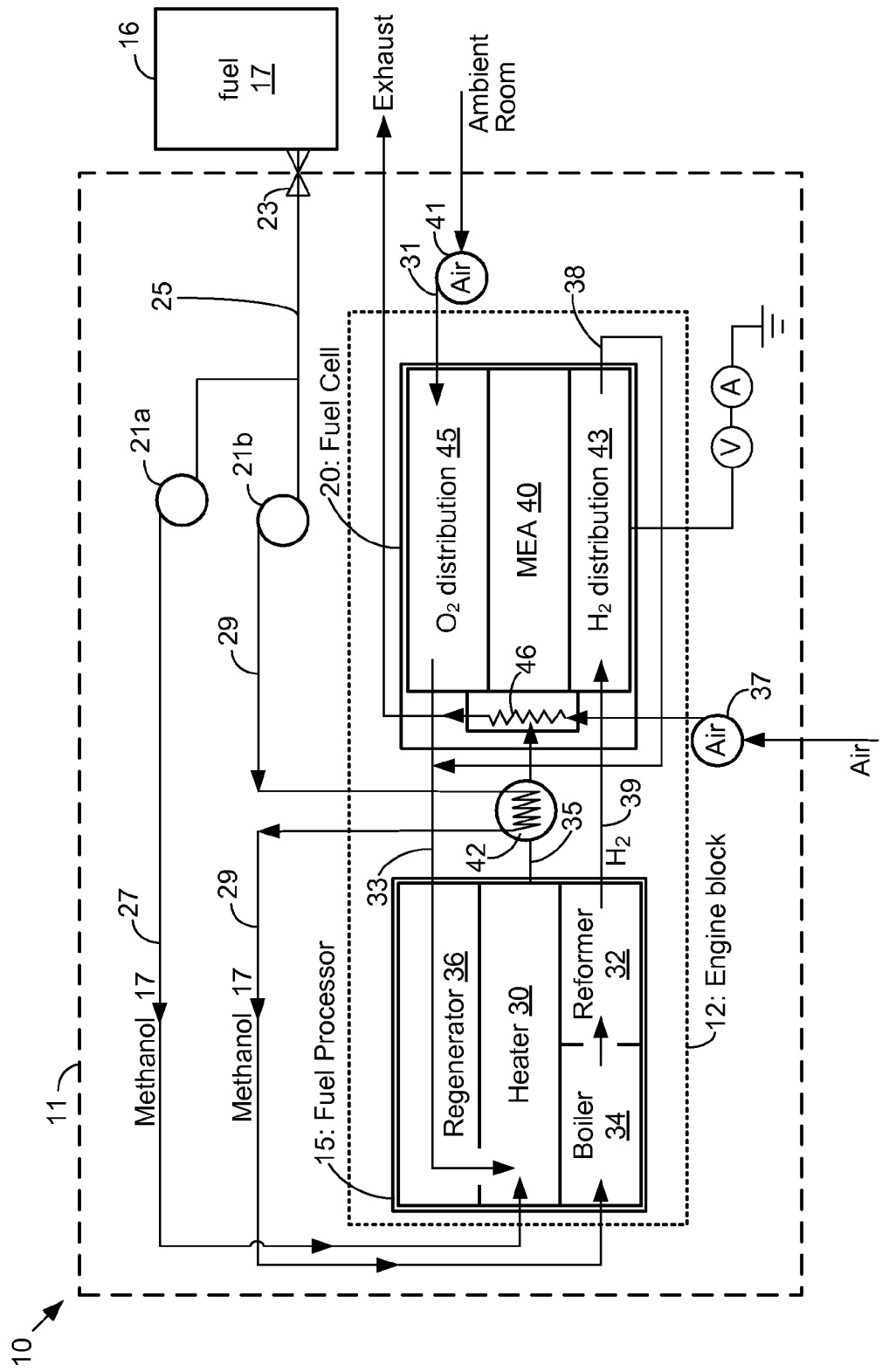
FIG. 1B illustrates schematic operation for the fuel cell system of FIG. 1A in accordance with a specific embodiment.

FIG. 1B illustrates schematic operation for the fuel cell system 10 of FIG. 1A in accordance with a specific embodiment.

Fuel cell system 10 is included in a portable package 11. In this case, package 11 includes fuel cell 20, fuel processor 15, and all other balance-of-plant components except cartridge 16. As the term is used herein, a fuel cell system package 11 refers to a fuel cell system that receives a fuel and outputs electrical energy. At a minimum, this includes a fuel cell and a fuel processor. The package need not include a cover or housing, e.g., in the case where a fuel cell, or a fuel cell and fuel processor, is included in a battery bay of a laptop computer. In this case, the portable fuel cell system package 11 only includes the fuel cell, or fuel cell and fuel processor, and no housing. The package may include a compact profile, low volume, or low mass—any of which is useful in any power application where size is relevant.

Package 11 is divided into two parts: a) an engine block 12 and b) all other parts and components of system 10 in the portable package 11 not included in engine block 12. In one embodiment, engine block 12 includes the core power-producing mechanical components of system 10. At a minimum, this includes fuel processor 15 and fuel cell 20. It may also include any plumbing configured to transport fluids between the two. Other system components included in engine block 12 may include: one or more sensors for fuel processor 15 and fuel cell 20, a glow plug or electrical heater for fuel heating in fuel processor during start-up, and/or one or more cooling components. Engine block 12 may include other system components. Components outside of engine block 12 may include: a body for the package, connector 23, inlet and outlet plumbing for system fluids to or from fuel processor 15 or fuel cell 20, one or more compressors or fans, electronic controls, system pumps and valves, any system sensors, manifolds, heat exchangers and electrical interconnects useful for carrying out functionality of fuel cell system 10.

In one embodiment, the engine block 12 includes a fuel cell, a fuel processor, and dedicated mechanical and fluidic connectivity between the two. The dedicated connectivity may provide a) fluid or gas communication between the fuel processor and the fuel cell, and/or b) structural support between the two or for the package. In one embodiment, an interconnect, which is a separate device dedicated to interconnecting the two devices, provides much of the connectivity. In another embodiment, direct and dedicated connectivity is provided on the fuel cell and/or fuel processor to interface with the other. For example, a fuel cell may be designed to interface with a particular fuel processor and includes dedicated connectivity for that fuel processor. Alternatively, a fuel processor may be designed to interface with a particular fuel cell. Assembling the fuel processor and fuel cell together in a common and substantially enclosed package 11 provides a portable 'black box' device that receives a fuel and outputs electrical energy.

In one embodiment, system 10 is sold as a physical engine block 12 plus specifications for interfacing with the engine block 12. The specifications may include desired cooling rates, airflow rates, physical sizing, heat capture and release information, plumbing specifications, fuel inlet parameters such as the fuel type, mixture and flow rates, etc. This permits engine block 12 to be sold as a core component employed in a wide variety of devices determined by the engine block purchaser. Sample devices include: portable fuel cell systems, consumer electronics components, single or ganged battery chargers for portable radios such as laptop computers, and custom electronics devices.

Fuel storage device 16 stores methanol or a methanol mixture as a hydrogen fuel 17. An outlet of storage device 16 includes a connector 23 that couples to a mating connector on package 11. In a specific embodiment, connector 23 and mating connector form a quick connect/disconnect for easy replacement of cartridges 16. The mating connector communicates methanol 17 into hydrogen fuel line 25, which is internal to package 11.

Line 25 divides into two lines: a first line 27 that transports methanol 17 to a burner/heater 30 for fuel processor 15 and a second line 29 that transports methanol 17 for a reformer 32 in fuel processor 15. Lines 25, 27 and 29 may comprise channels disposed in the fuel processor (e.g., channels in one or more metal components) and/or tubes leading thereto.

As the term is used herein, a line refers to one or more conduits or channels that communicate a fluid (a gas, liquid, or combination thereof). For example, a line may include a separable plastic conduit. In a specific embodiment to reduce package size, the fuel cell and the fuel processor may each include a molded channel dedicated to the delivering hydrogen from the processor to the cell. The channeling may be included in a structure for each. When the fuel cell attaches directly to the fuel processor, the hydrogen transport line then includes a) channeling in the fuel processor to deliver hydrogen from a reformer to the connection, and b) channeling in the fuel cell to deliver the hydrogen from the connection to a hydrogen intake manifold. An interconnect may also facilitate connection between the fuel cell and the fuel processor. The interconnect includes an integrated hydrogen conduit dedicated to hydrogen transfer from the fuel processor to the fuel cell. Other plumbing techniques known to those of skill in the art may be used to transport fluids in a line.

Flow control is provided on each line 27 and 29. In this embodiment, separate pumps 21*a* and 21*b* are provided for lines 27 and 29, respectively, to pressurize each line separately and transfer methanol at independent rates, if desired. A model 030SP-S6112 pump as provided by Biochem, NJ is suitable to transmit liquid methanol on either line in a specific embodiment. A peristaltic, electro-osmotic, diaphragm or piezoelectric pump is also suitable for use with system 10. A flow restriction may also be provided on each line 27 and 29 to facilitate sensor feedback and flow rate control. In conjunction with suitable control, such as digital control applied by a processor that implements instructions from stored software, each pump 21 responds to control signals from the processor and moves a desired amount of methanol 17 from storage device 16 to heater 30 and reformer 32 on each line 27 and 29.

Air source 41 delivers oxygen and air from the ambient room through line 31 to the cathode in fuel cell 20, where some oxygen is used in the cathode to generate electricity. Air source 41 may include a pump, fan, blower, or compressor, for example. Low pressure airflow embodiments are described below with respect to FIG. 7.

High operating temperatures in fuel cell 20 also heat the oxygen and air. In the embodiment shown, the heated oxygen and air is then transmitted from the fuel cell, via line 33, to a regenerator 36 (also referred to herein as a 'dewar') of fuel processor 15, where the air is additionally heated (by escaping heat from heater 30) before the air enters heater 30. This double pre-heating increases efficiency of fuel cell system 10 by a) reducing heat lost to reactants in heater 30 (such as fresh oxygen that would otherwise be near room temperature when combusted in the heater), and b) cooling the fuel cell during energy production. In a specific embodiment, a model BTC compressor as provided by Hargraves, N.C. is suitable to pressurize oxygen and air for fuel cell system 10. Other air moving devices such as fans, blowers, gerotor compressors etc are also suitable.

When fuel cell cooling is needed, a fan 37 blows air from the ambient room over fuel cell 20. Fan 37 may be suitably sized to move air as desired by the heating requirements of fuel cell 20; many vendors known to those of skill in the art provide fans and blowers suitable for use with package 10.

Fuel processor 15 is configured to process fuel 17 and output hydrogen. Fuel processor 15 comprises heater 30, reformer 32, boiler 34, and regenerator 36. Heater 30 (also referred to herein as a burner when it uses catalytic combustion to generate heat) includes an inlet that receives methanol 17 from line 27. In a specific embodiment, the burner includes a catalyst that helps generate heat from methanol, such as platinum or palladium coated onto a suitable support or alumina pellets for example.

In a specific embodiment, heater 30 includes its own boiler to preheat fuel for the heater. Boiler 34 includes a chamber having an inlet that receives methanol 17 from line 29. The boiler chamber is configured to receive heat from heater 30, via heat conduction through one or more walls between the boiler 34 and heater 30, and use the heat to boil the methanol passing through the boiler chamber. The structure of boiler 34 permits heat produced in heater 30 to heat methanol 17 in boiler 34 before reformer 32 receives the methanol 17. In a specific embodiment, the boiler chamber is sized to boil methanol before receipt by reformer 32. Boiler 34 includes an outlet that provides heated methanol 17 to reformer 32.

Reformer 32 includes an inlet that receives heated methanol 17 from boiler 34. A catalyst in reformer 32 reacts with the methanol 17 to produce hydrogen and carbon dioxide; this reaction is endothermic and draws heat from heater 30. A hydrogen outlet of reformer 32 outputs hydrogen to line 39. In one embodiment, fuel processor 15 also includes a preferential oxidizer that intercepts reformer 32 hydrogen exhaust and decreases the amount of carbon monoxide in the exhaust. The preferential oxidizer employs oxygen from an air inlet to the preferential oxidizer and a catalyst, such as ruthenium that is preferential to carbon monoxide over hydrogen.

Regenerator 36 pre-heats incoming air before the air enters heater 30. In one sense, regenerator 36 uses outward traveling waste heat in fuel processor 15 to increase thermal management and thermal efficiency of the fuel processor. Specifically, waste heat from heater 30 pre-heats incoming air provided to heater 30 to reduce heat transfer to the air within the heater. As a result, more heat transfers from the heater to reformer 32. The regenerator also functions as insulation. More specifically, by reducing the overall amount of heat loss from fuel processor 15, regenerator 36 also reduces heat loss from package 11. This enables a cooler fuel cell system 10 package.

In one embodiment, fuel processor 15 includes a monolithic structure having common walls between the heater 30 and other chambers in the fuel processor. Fuel processors suitable for use herein are further described in commonly owned patent application Ser. No. 10/877,044, which is incorporated by reference in its entirety for all purposes.

Line 39 transports hydrogen (or 'reformate') from fuel processor 15 to fuel cell 20. In a specific embodiment, gaseous delivery lines 33, 35 and 39 include channels in a metal interconnect that couples to both fuel processor 15 and fuel cell 20. A hydrogen flow sensor (not shown) may also be added on line 39 to detect and communicate the amount of hydrogen being delivered to fuel cell 20. In conjunction with the hydrogen flow sensor and suitable control, such as digital control applied by a processor that implements instructions from stored software, system 10 regulates hydrogen gas provision to fuel cell 20.

Fuel cell 20 includes a hydrogen inlet port that receives hydrogen from line 39 and includes a hydrogen intake manifold that delivers the gas to one or more bi-polar plates and their hydrogen distribution channels. An oxygen inlet port of fuel cell 20 receives oxygen from line 31; an oxygen intake manifold receives the oxygen from the port and delivers the oxygen to one or more bi-polar plates and their oxygen distribution channels. A cathode exhaust manifold collects gases from the oxygen distribution channels and delivers them to a cathode exhaust port and line 33, or to the ambient room. An anode exhaust manifold 38 collects gases from the hydrogen distribution channels, and in one embodiment, delivers the gases to the ambient room.

In a specific embodiment, and as shown, the anode exhaust is transferred back to fuel processor 15. In this case, system 10 comprises plumbing 38 that transports unused hydrogen from the anode exhaust to heater 30. For system 10, heater 30 includes two inlets: an inlet configured to receive fuel 17 and an inlet configured to receive hydrogen from line 38. Heater 30 then includes a thermal catalyst that reacts with the unused hydrogen to produce heat. Since hydrogen consumption within a PEM fuel cell 20 is often incomplete and the anode exhaust often includes unused hydrogen, re-routing the anode exhaust to heater 30 allows a fuel cell system to capitalize on unused hydrogen and increase hydrogen usage and energy efficiency. The fuel cell system thus provides flexibility to use different fuels in a catalytic heater 30. For example, if fuel cell 20 can reliably and efficiently consume over 90% of the hydrogen in the anode stream, then there may not be sufficient hydrogen to maintain reformer and boiler operating temperatures in fuel processor 15. Under this circumstance, methanol supply is increased to produce additional heat to maintain the reformer and boiler temperatures. In one embodiment, gaseous delivery in line 38 back to fuel processor 15 relies on pressure at the exhaust of the anode gas distribution channels, e.g., in the anode exhaust manifold. In another embodiment, an anode recycling pump or fan is added to line 38 to pressurize the line and return unused hydrogen back to fuel processor 15. The unused hydrogen is then combusted for heat generation.

In one embodiment, fuel cell 20 includes one or more heat transfer appendages 46 that permit conductive heat transfer with internal portions of a fuel cell stack. This may be done for heating and/or cooling fuel cell 20. In a specific heating embodiment, exhaust 35 of heater 30 is transported to the one or more heat transfer appendages 46 during system start-up to expedite reaching initial elevated operating temperatures in fuel cell 20. The heat may come from hot exhaust gases or unburned fuel in the exhaust, which then interacts with a catalyst disposed on or in proximity with a heat transfer appendage 46. In a specific cooling embodiment, fan 37 blows cooling air over the one or more heat transfer appendages 46, which provides dedicated and controllable cooling of the stack during electrical energy production. Fuel cells suitable for use herein are further described in commonly owned patent application Ser. No. 10/877,770, which is incorporated by reference in its entirety for all purposes.

In one embodiment, system 10 increases thermal and overall energy efficiency of a portable fuel cell system by using waste heat in the system to heat incoming reactants such as an incoming fuel or air. To this end, the embodiment in FIG. 1B includes heat exchanger, or recuperator, 42. FIGS. 5-8 below describe other embodiments that use waste heat to heat an incoming fluid.

Heat exchanger 42 transfers heat from fuel cell system 10 to the inlet fuel 17 before the methanol reaches fuel processor 15. This increases thermal efficiency for system 10 by preheating the incoming fuel (to reduce heating of the fuel in heater 30) and reuses heat that would otherwise be expended from the system. While system 10 shows heat exchanger 42 heating methanol in line 29 that carries fuel 17 to the boiler 34 and reformer 32, it is understood that heat exchanger 42 may be used to heat methanol in line 27 that carries fuel 17 to burner 30.

Heat exchanger 42 may include any device configured to transfer heat produced in fuel cell system 10, or from a fluid heated in fuel cell system 10 and used as a carrier of the heat, to an incoming reactant such as fuel 17 or air. Heat exchanger 42 may rely on conductive heat transfer, convective heat transfer, and combinations thereof. Heat exchanger 42 may include one or more heat transfer channels for moving the incoming fuel 17, moving the heating medium, and one or more surfaces or structures for transferring heat from the heating medium to the incoming fuel 17. In one embodiment, heat exchanger 42 includes a commercially available heat exchanger. In another embodiment, heat exchanger 42 is a custom made device, such as one of those shown in FIGS. 11A-11C.

In addition to the components shown in shown in FIG. 1B, system 10 may also include other elements such as electronic controls, additional pumps and valves, added system sensors, manifolds, heat exchangers and electrical interconnects useful for carrying out functionality of a fuel cell system 10 that are known to one of skill in the art and omitted for sake of brevity. FIG. 1B shows one specific plumbing arrangement for a fuel cell system; other plumbing arrangements are suitable for use herein. For example, the heat transfer appendages 46, a heat exchanger and dewar 36 need not be included. Other alterations to system 10 are permissible, as one of skill in the art will appreciate.

System 10 generates dc voltage, and is suitable for use in a wide variety of portable applications. For example, electrical energy generated by fuel cell 20 may power a notebook computer 11 or a portable electrical generator 11 carried by military personnel.

In one embodiment, system 10 provides portable, or 'small', fuel cell systems that are configured to output less than 200 watts of power (net or total). Fuel cell systems of this size are commonly referred to as 'micro fuel cell systems' and are well suited for use with portable electronics devices. In one embodiment, the fuel cell is configured to generate from about 1 milliwatt to about 200 Watts. In another embodiment, the fuel cell generates from about 5 Watts to about 60 Watts. Fuel cell system 10 may be a stand-alone system, which is a single package 11 that produces power as long as it has access to a) oxygen and b) hydrogen or a fuel such as a hydrocarbon fuel. One specific portable fuel cell package produces about 20 Watts or about 45 Watts, depending on the number of cells in a stack for fuel cell 20 and the amount of catalyst in the fuel processor reformer and burner reactors.

In addition to power capacity, portable fuel cell system 10 may also be characterized by its size or power density. Volume may characterize package 11, where the volume includes all components of the package 11 used in system 10, save the external storage device 16, whose size may change. In a specific embodiment, package 11 has a total volume less than about a liter. In a specific embodiment, package 11 has a total volume less than about ½ liter. Greater and lesser package volumes may be used with system 10.

Portable package 11 also includes a relatively small mass. In one embodiment, package 11 has a total mass less than about a 1 kilogram. In a specific embodiment, package 11 has a total volume less than about ½ liter. Greater and lesser package masses are permissible.

Power density may also be used to characterize system 10 or package 11. Power density refers to the ratio of electrical power output provided by a fuel cell system included relative to a physical parameter such as volume or mass of package 11. Notably, fuel cell systems described herein provide fuel cell packages with power densities not yet attained in the fuel cell industry. In one embodiment, fuel cell package 11 provides a power density of greater than about 40 Watts/liter. This package includes all balance of plant items (cooling system, power conversion, start-up battery, etc.) except the fuel and fuel source storage device 16. In another specific embodiment, fuel cell package 11 provides a power density of greater than about 80 Watts/liter. A power density from about 45 Watts/liter to about 90 Watts/liter works well for many portable applications. Greater and lesser power densities are also permissible.

Fuel Cell System Operation

Fuel cell system 10 has two main phases of operation: a) steady state operation and b) warm-up. System 10 may include other phases, such as a cool down phase, which are not elaborated on for sake of brevity.

Figure 2:
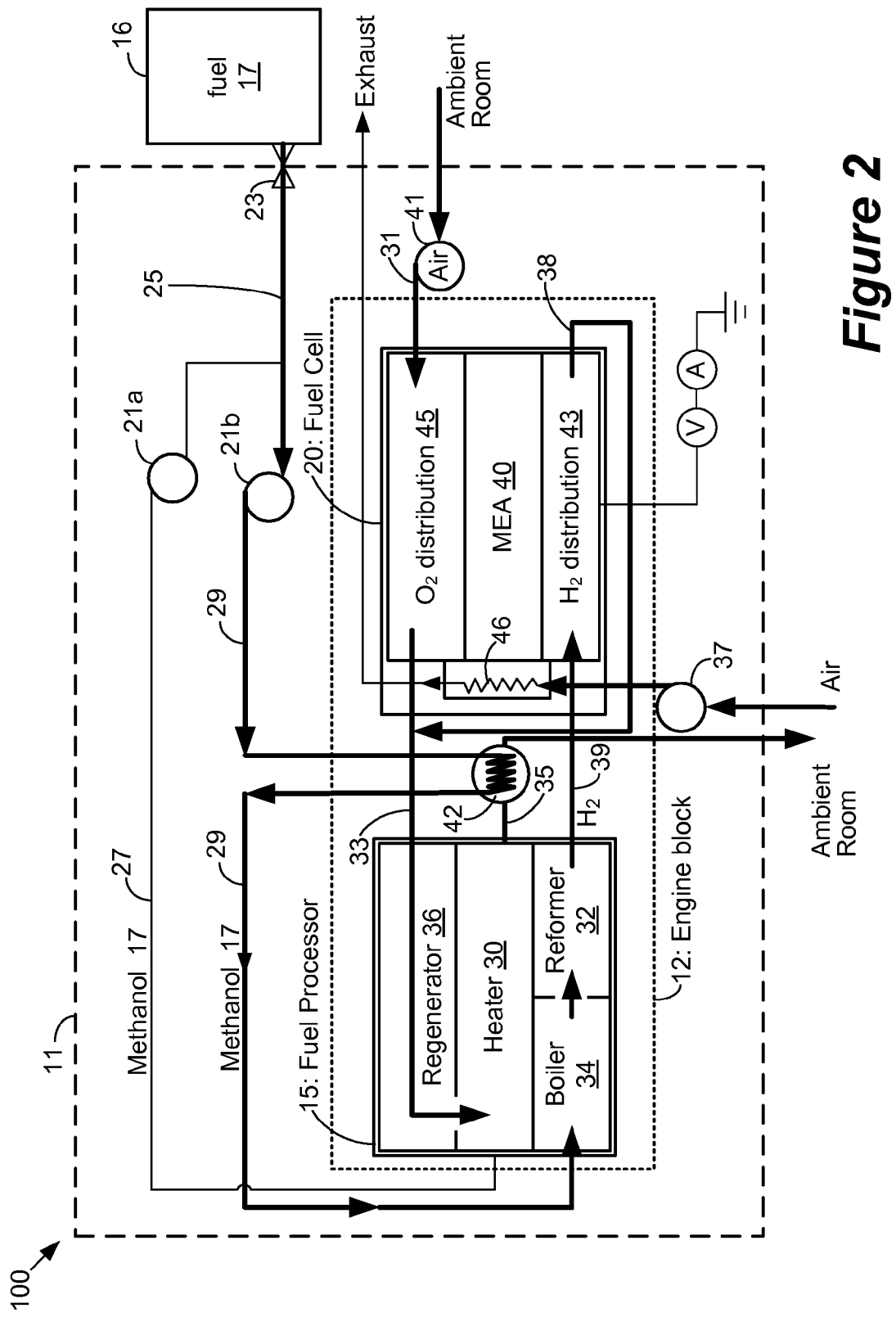
FIG. 2 shows a method for steady state operation and electrical energy generation of a portable fuel cell system in accordance with one embodiment.

FIG. 2 will be used to show a method 100 for steady state operation of fuel cell system 10 in accordance with one embodiment. Bolded arrows in FIG. 2 show the movement of fluids for steady state operation in system 10.

Steady state operation occurs when the fuel cell 20 generates electrical energy. Typically, fuel cell 20 generates heat during electrical energy generation. Method 100 uses this heat to increase fuel cell system efficiency. As the term is used herein, fuel cell system efficiency refers to the ratio of output energy to input chemical energy of the fuel. Input energy for a fuel cell system can be determined over a set period of time by the energy capacity in fuel 17 and the amount of fuel taken from storage device 16 over the set period of time. Output energy is typically measured by the electrical output of fuel cell 20.

Method 100 begins by providing fuel to a reformer in the fuel processor on lines 25 and 29. Method 100 also pre-heats fuel 17 after the fuel exits storage device 16 and before it enters fuel processor 15. In one embodiment, the preheating employs waste heat in system 10. Waste heat in this sense refers to heat that typically would contribute to inefficiency of the system, such as heat that would escape system package 11. In one embodiment, heat used to warm fuel 17 is carried by a fluid in fuel cell system 10. Fluids (a gas or liquid) suitable for use in this manner may include one or more of: the cathode exhaust from fuel cell 20 in line 33, reformer 32 exhaust from fuel processor 15 in line 39, burner 34 exhaust from fuel processor 15 in line 35 (as shown in FIG. 1B), anode exhaust from fuel cell 20 in line 38, or combinations thereof. Fuel cell 20 and fuel processor 15 both run at elevated temperatures during steady-state operation. Any fluids emitted from fuel cell 20 and fuel processor 15 will also be at elevated temperatures and are suitable for heating the incoming fuel. FIG. 6B below describes using fuel cell 20 to heat the incoming fuel.

The pre-heated fuel is provided into reformer 32 along a second portion of line 29 between the heat exchanger 42 and reformer 32. In this case, the fuel 17 also passes through boiler 34, which boils the fuel if this has already not been accomplished in line 29.

Reformer 32 converts the fuel 17 to reformate gas. Method 100 then feeds the reformate gas to a fuel cell anode where the fuel cell consumes some, but not all, of the hydrogen in the reformate gas for electrochemical energy generation (108)

The method routes the hydrogen-depleted reformate back to another part of system 10 to use any remaining hydrogen and capitalize on the energy available in the hydrogen. In one embodiment, the fuel cell system plumbs the hydrogen-depleted reformate back to a catalytic heater 30 located in fuel processor 15. The catalytic heater oxidizes the remaining hydrogen to generate heat. The fuel processor is configured to transfer the heat, at least partially, to reformer 32 to supply heat of formation of incoming fuel 17.

Air movement occurs concurrently with the fuel movement in method 100. First, ambient air is provided via a pressure source into the cathode of fuel cell 20. The fuel cell consumes oxygen in the air proportionally to the fuel consumed at the anode. The fuel cell also heats the air, and adds some water in the form of steam. In one embodiment, the air is (pre-) heated to the fuel cell 20 temperature before leaving the fuel cell. In a specific embodiment, fuel cell 20 operates between about 120 degrees Celsius and about 200 degrees Celsius.

For system 10, the oxygen-reduced, steam-enriched, and heated air exits fuel cell 20 and is provided to regenerator 36 in fuel processor 15, where the heated air receives additional heat from heater 30 while in regenerator 36, thereby further reducing the heat load within burner 30. The dually heated air then enters the heater 30 for catalytic heat generation using fuel 17.

Exhaust from heater 30, including the bi-products of the catalytic heat generation, enters line 35, where heat in the exhaust warms incoming fuel 17, as described above using heat exchanger 42, where heat from the exhaust gas is transferred into the liquid fuel 17 inlet to the reformer 32. This heat exchange allows for heated and pre-vaporized fuel 17 to enter a reforming chamber, thereby reducing the heat duty on burner 30 and increasing the system efficiency. During steady state operation, line 35 routes the exhaust, after the exhaust passes through heat exchanger 42, out of package 11 and into the ambient room. Alternative embodiments that use heat in the exhaust from heater 30 are described below.

If needed, a separate fan, blower or other pressure source 37 moves air to the fuel cell 20 for cooling. Embodiments described below also add a heat exchanger to fuel cell 20 that transfers heat from the fuel cell to incoming fuel 17 or incoming air provided to the fuel processor. These embodiments also reduce the amount of cooling done by fan 37.

Figure 3:
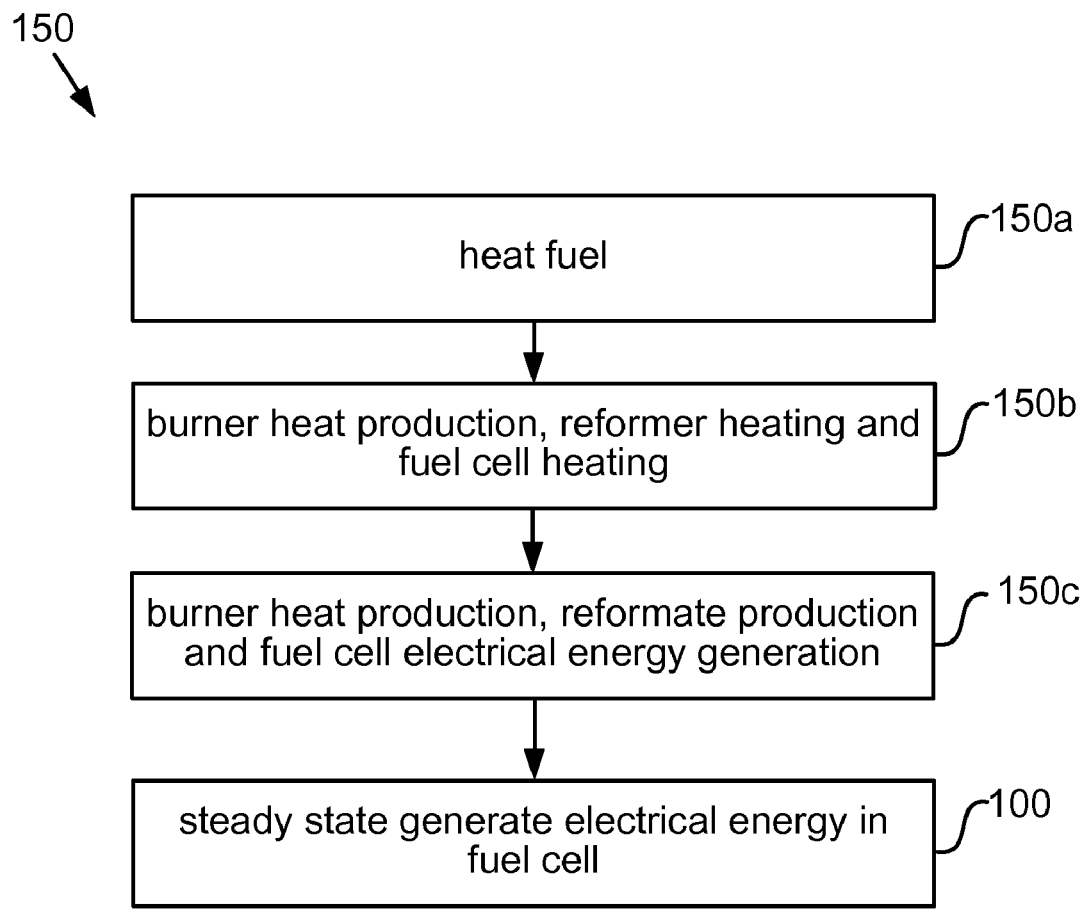
FIG. 3 shows a method for warm-up operation of a fuel cell system in accordance with another embodiment.
Figure 4A:
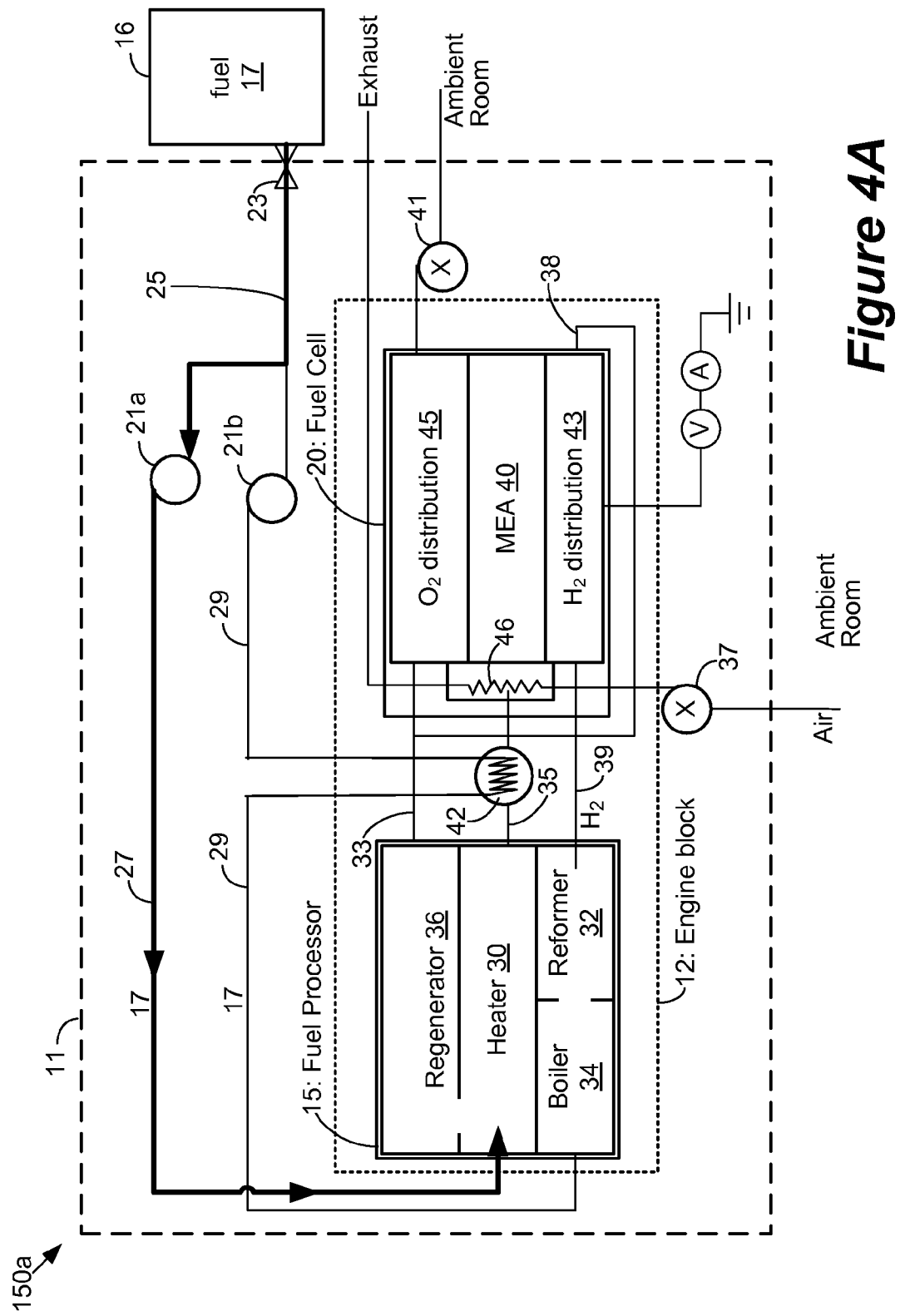
FIGS. 4A-4C show three stages of fuel cell warm-up according to a specific embodiment of FIG. 3.
Figure 4B:
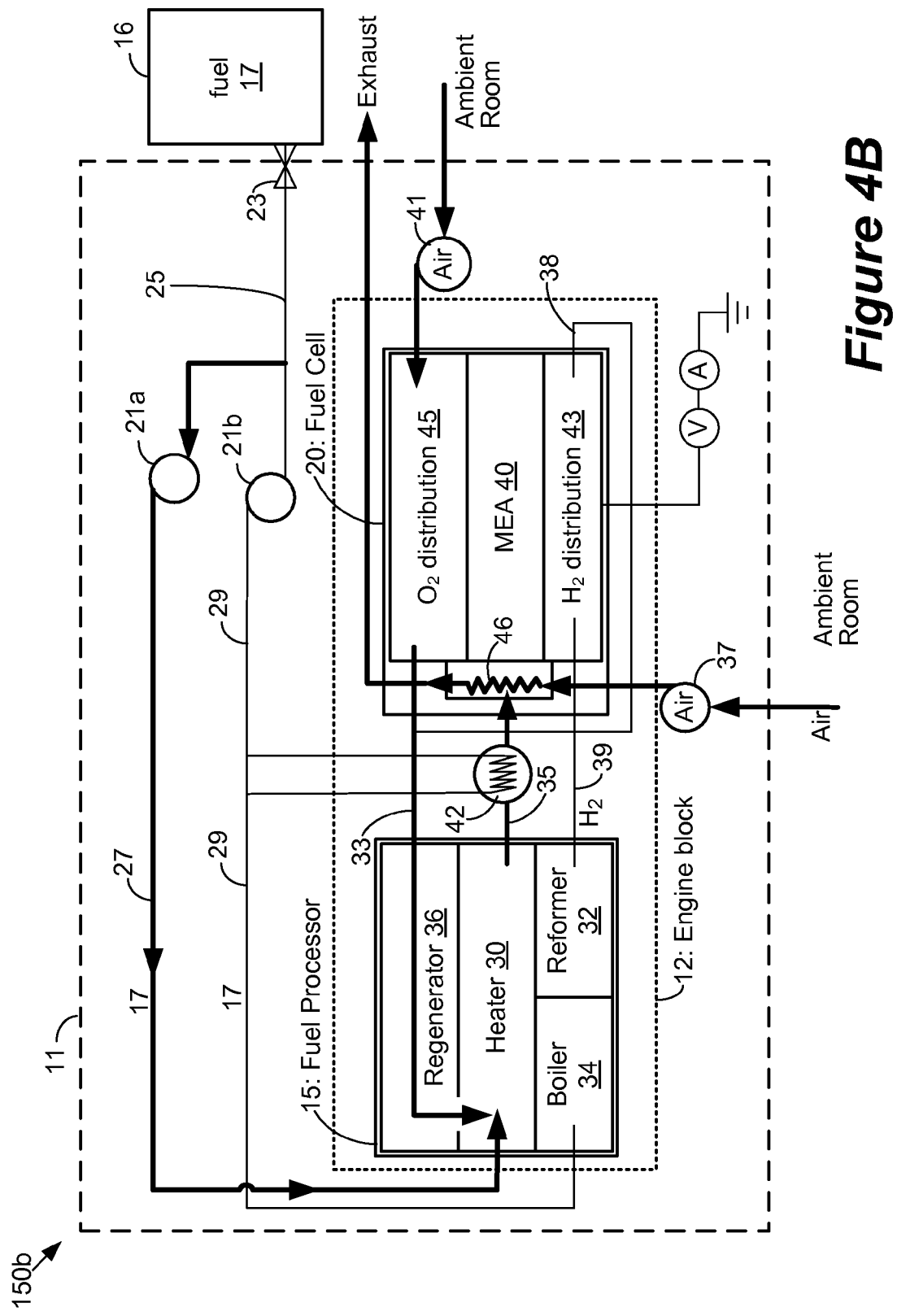
Figure 4C:
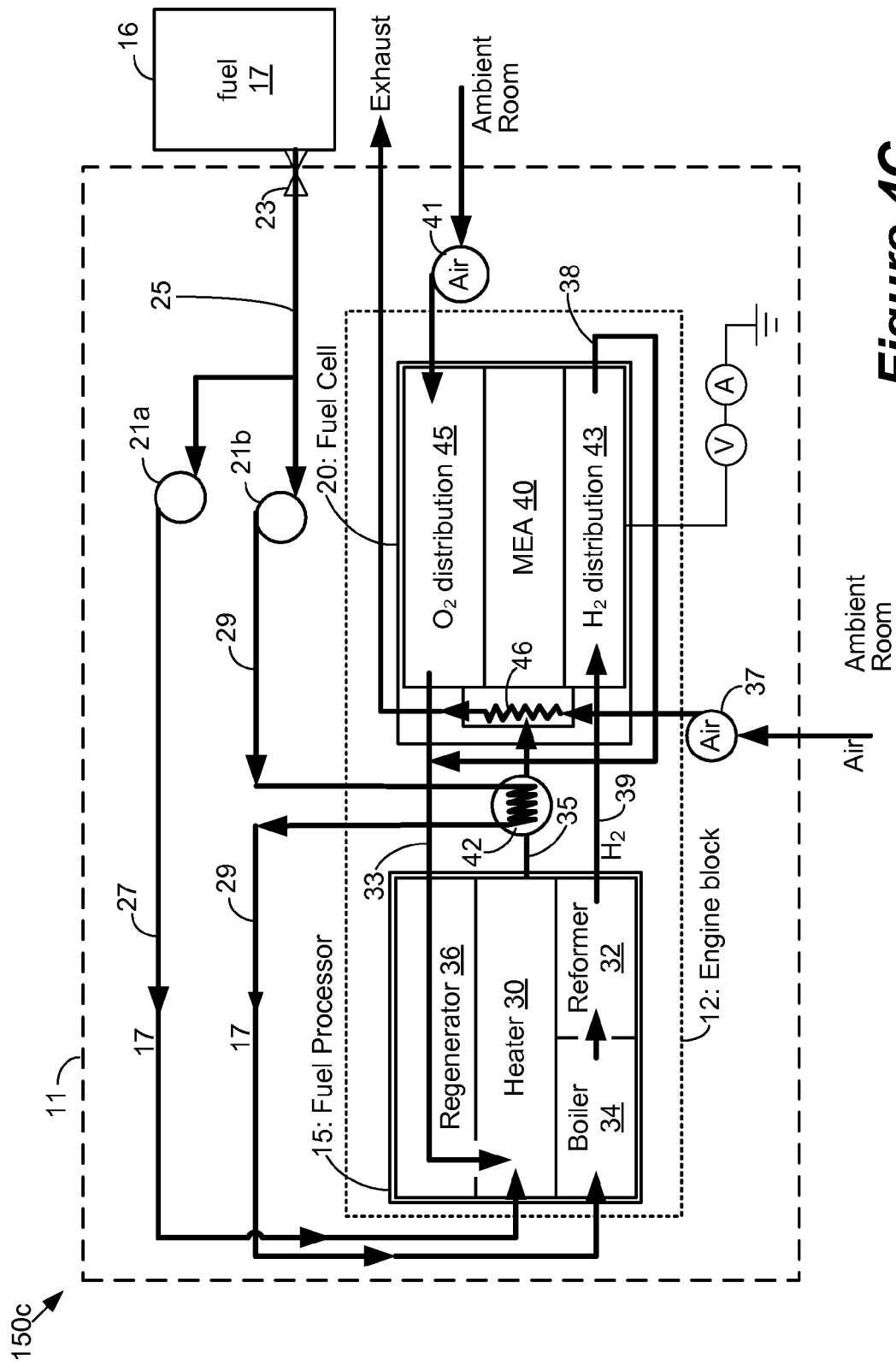

FIG. 3 shows a method 150 for warm-up operation of fuel cell system 10 in accordance with another embodiment. Method 150 is divided into three stages: a) burner fuel heating, b) burner heat production, reformer heating and fuel cell heating, and c) burner heat production, reformate production and initial electrical energy generation in the fuel cell. FIGS. 4A-4C show these three stages in accordance with specific embodiments; bolded arrows in FIGS. 4A-4C show the movement of fluids for each stage of method 150.

Fuel cell 20 has a minimum operating temperature. Warm-up method 150 seeks to raise the temperature of fuel cell 20 to this minimum operating temperature. In one embodiment, the minimum operating temperature of fuel cell 20 is greater than about 120 degrees Celsius. In a specific embodiment, the minimum operating temperature of fuel cell 20 is greater than about 160 degrees Celsius.

Warming method 150 may occur at initial start-up, or during intermittent periods of system 10 rest when fuel cell 20 is not generating electrical energy and the fuel cell temperature has dropped below the fuel cell minimum operating temperature. More specifically, when not generating electrical energy, since the ambient room or atmosphere is usually cooler than the fuel cell operating temperature, system 10 and fuel cell 20 loses heat to the ambient environment. Correspondingly, fuel cell 20 cools, and often eventually drops below its minimum operating temperature.

The first stage 150a, or burner fuel heating, begins with fuel 17 provision to the heater 30 in line 29. In one embodiment to facilitate fuel 17 boiling before reaching an internal burner chamber, system 10 includes an electrical heating device configured to heat the incoming burner fuel. The electrical heating device includes one or more heating surfaces that contact the incoming fuel. One suitable resistive electrical heating device is shown below with respect to FIGS. 10A and 10B. In a specific embodiment, the electrical heating device is activated until the heating surface reaches about 300-500 degrees Celsius. Other heater start temperatures are suitable for use. Methanol 17 in line 27 contacts the heating surface, flash boils, and the resultant methanol vapor mixes with air to form a combustible mixture.

Heater 30 then consumes the vaporized fuel 17 to generate heat. Heat generation in burner 30 also begins stage two, 150b, of FIG. 3. FIG. 4B shows one specific embodiment for this stage. In one embodiment, a burner catalyst in burner 30 then generates heat with fuel 27. Portions of the heat may be provided to the reformer 32, the fuel cell 20, incoming fuel 17, and combinations thereof. In one embodiment, fuel processor is configured such that heat from burner 30 conducts through common walls shared by burner 30 and reformer 32. In another embodiment, burner 30 surrounds reformer 32 on multiple sides of reformer 32 on to permit heat transfer in multiple directions inwards to reformer 32 and to increase the shared surface area between the two. Further description of a fuel processor suitable for use herein is described in commonly owned patent application Ser. No. 11/313,252 and entitled 'Fuel Processor For Use With Portable Fuel Cells'; this document is included by reference herein in its entirety for all purposes.

During stage two, 150b, exhaust from heater 30 is provided to fuel cell 20 for catalytic heating of the fuel cell. In one embodiment, fuel cell 20 includes a thermal catalyst in thermal communication with the fuel cell. For system 10, the fuel cell includes a heat transfer appendage 46 in conductive thermal communication with an externally arranged thermal catalyst and internal portions of the fuel cell. The heat transfer appendages permit conductive heat transfer from the externally arranged thermal catalyst into the fuel cell, which expedites fuel cell heating and start up times. A fan, blower or other pressure source 37 moves air to the fuel cell 20 for reaction with the fuel and thermal catalyst. Ideally, any remaining fuel or hydrogen in the exhaust is oxidized to generate heat, but this is not a requirement. Further description of catalytic heating of a fuel cell and heat transfer appendage 46 is provided in commonly owned U.S. patent application Ser. No. 11/314,810, entitled "HEAT EFFICIENT PORTABLE CELL SYSTEMS", which was incorporated by reference above. Other techniques to heat the fuel cell are also suitable for use, such as resistive heating with a resistive element.

In a specific embodiment during stage two 150b of method 150 that includes both heat exchanger 42 and fuel cell catalytic heating using the burner exhaust, the heater exhaust bypasses heat exchanger 42. This embodiment expedites fuel cell warm-up time and is described in further detail below with respect to FIG. 6A.

Fuel provision in line 27 and heat generation in burner 30 continues until the fuel processor 15, or some portion thereof such as reformer 32, reaches a minimum operating temperature and/or the fuel cell reaches its minimum operating temperature. In a specific embodiment, the condensing point of reformate gas represents the minimum operating temperature for reformer 32 or fuel processor 15. In another specific embodiment, fuel processor 15 includes a minimum operating temperature between about 240 and about 300 degrees Celsius. A sensor may be included in reformer 32 or fuel processor 15 to detect the desired temperature. Other fuel processor start temperatures are suitable for use. As one of skill in the art will appreciate, the fuel processor 15 minimum operating temperature may vary with the thermal catalyst used in heater and fuel 17 type.

Stage three, 150c, of method 150 begins when the fuel processor and/or the fuel cell reaches a minimum operating temperature (see FIG. 4C). In a specific embodiment, fuel cell system 10 runs dirty reformate through the fuel cell stack and reforming in fuel processor 15 begins before electrical energy generation in fuel cell 20. The dirty reformate is then routed back to fuel processor in line 38 for catalytic heat generation of the hydrogen using a catalyst in burner 30.

For hydrogen production, line 27 transports fuel 17 into reformer 32. A catalyst in reformer 32 helps convert the fuel 17 into a hydrogen rich gas stream, or reformate. The reformate passes in line 39 to fuel cell 20, where electrical energy generation occurs.

Inlet reformer fuel in line 29 also passes through heat exchanger 42. As mentioned before, incoming fuel 17 to reformer 32 is vaporized before processing by a reforming catalyst in the reformer. (Similarly, incoming methanol to burner 30 is vaporized before meeting the burner catalyst.) The fuel 17 typically enters the fuel cell package at its storage temperature in storage device 16, such as the ambient temperature surrounding the fuel cell system, which is normally cooler than the operating temperatures of fuel cell 20 and fuel processor 15, or fluids emitted from these devices. Any heat transferred to fuel 17 before vaporization of fuel in fuel processor 15 (in the burner or reformer) reduces the amount of energy that heater 30 in fuel processor 15 supplies to the cold fuel in the reformer chamber or burner chamber. This preheating of fuel 17 increases efficiency by i) leaving more heat for the reformer and catalytic production of hydrogen and thereby consuming less fuel to heat fuel processor 15, and ii) using waste heat from the burner exhaust that might otherwise leave the system. For heat exchanger 42, this also reduces the burner exhaust temperature leaving package 11. If an electrical heater is used to vaporize the incoming methanol, heat exchanger 42 also reduces electrical energy used by the electrical heater to vaporize the incoming fuel.

Line 39 transports the reformate to the fuel cell 20 anode. During warm-up method 150, fuel cell 20 consumes a small amount of hydrogen at the anode, which produces a small load applied to keep the average fuel cell voltage less than 0.75V/cell. This may reduce carbon corrosion in fuel cell 20.

Reformate then is fed back in line 38 from the fuel cell to the burner 30 in fuel processor 15 where some fuel is oxidized (rich mixture), releasing heat into the fuel processor. In a specific embodiment, the amount of unused hydrogen in line 38 is determined by a temperature measured by a sensor included in the fuel processor.

Finally, the hot burner exhaust passes through the heat exchanger 42 and into the fuel cell catalyst on heat transfer appendage 46, whereupon the remaining fuel is oxidized by addition of oxygen from the startup blower 37.

In a specific embodiment, the fuel cell cooling air provided by fan 37 and the fuel cell burner exhaust in line 35 converge into a single stream: the system 10 exhaust. This dilutes the exhaust temperature from system 10 into the ambient room. In one embodiment, the system exhaust is further passed over an exhaust section of the storage device 16 housing. In this case, the cartridge housing includes one or more exhaust filters and/or sensors. The filter is configured to cleanse the exhaust of one or more chemicals. The sensor may be a temperature sensor, CO, sensor, or a oxygen sensor, for example.

Stage three, 150c, of method 150 continues until fuel cell 20 reaches its minimum operating temperature. At this point, full energy generation in the fuel cell begins, which is exothermic, and the system transitions to method 100.

An alternative energy source such as a battery or capacitor, located internal or external to a packaged fuel cell system, may supply power to the load while the fuel cell is warming up. When the fuel cell 20 reaches its minimum operating temperature, the fuel cell may then recharge the battery or capacitor.

Method 150 permits fast start times from a resting temperature. Resting temperature refers to when the fuel cell system and its constituent components matches the temperature of the ambient environment. In one embodiment, method 150 permits fuel cell 20 to begin electrical energy generation in less than about twelve minutes, measured from one of: a) the time that a user requests power from the system 10 to the time that fuel cell 20 powers a load for the user, or b) the time that the fuel processor begins heating cold fuel (e.g., fuel at ambient temperature) to electrical energy production in the fuel cell. In a specific embodiment, fuel cell 20 begins electrical energy generation in less than about 10 minutes.

The start time may vary with the temperature of the ambient environment. Notably, however, fuel cell system 10 and method 150 permit 'cold starting'. Cold starting refers to starting a fuel cell or fuel cell system from an initial temperature of a fuel cell system (and its constituent components) that is less than about 0 degrees Celsius, or the freezing point of water. In other words, fuel cell system is suitable for use when left in freezing conditions. Many conventional fuel cell systems are typically restricted from this practice since: a) they employ water, and freezing and expanding of the water may lead to structural damage; and/or b) start-up of the fuel cell system requires movement of water, which, again, is frozen, before the system becomes hot. System 10, however, does not suffer from such draw backs and permits repeated transition above and below 0 degrees Celsius. In one embodiment, method 150 permits system 10 to begin from temperatures less than about 0 degrees Celsius. Start-up times in this case may be less than about 20 minutes. Increasing the size of burner 30 may also reduce the startup time to less than 10 minutes. In a specific embodiment, method 150 permits system 10 to begin from temperatures less than about 30 degrees Celsius. Start-up time in this case may be less than 20 minutes. Of course, longer start times may be used.

Alternative Systems

This section describes alternative RMFC system layouts.

Figure 5A:
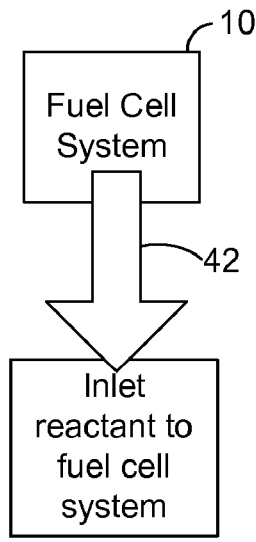
FIG. 5A illustrates a thermally efficient fuel cell system for producing electrical energy in accordance with one embodiment.

Heat exchanger 42 was described above with respect to FIG. 1B as transferring heat from the burner exhaust to inlet reformer fuel. Other hot to cold heat transfers and configurations are permissible. FIG. 5A illustrates a thermally efficient fuel cell system 10 for producing electrical energy in accordance with one embodiment. In general, heat may be transferred to any incoming fluid (a gas, liquid, and/or combination thereof), including but not limited to: a reactant in fuel cell 20, a reactant in fuel processor 15, and/or one or more of the cooling air paths.

The heat may be transferred from a variety of sources in system 10. Fuel cell 20 and fuel processor 15 both operate at elevated temperatures—during steady-state operation, and often during warm-up periods as well. Portions of fuel cell 20 and/or fuel processor 15 may thus be coupled to for direct heat transfer from the fuel cell or fuel processor to the colder fluid. Any fluids emitted from fuel cell 20 and fuel processor 15 will also be at elevated temperatures and are suitable for heat transfer to the incoming reactant fluid(s). In this case, the heated fluid acts as a heat carrier from the fuel cell 20 or fuel processor 15 to the cooler fluid. Fluids (a gas, liquid, and/or combination thereof) suitable for use in this manner include: the cathode exhaust from fuel cell 20 in line 33, the reformer 32 exhaust from fuel processor 15, the burner 34 exhaust from fuel processor 15 in line 35, the anode exhaust from fuel cell 20 in line 38, or combinations thereof. In one embodiment, the heat used to warm fuel 17 comes from a device in system 10.

Figure 5B:
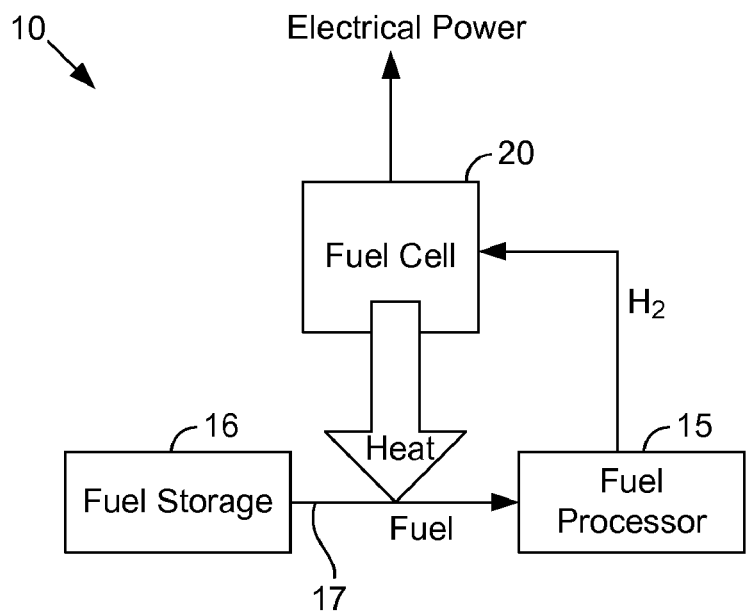
FIG. 5B illustrates a fuel cell system that uses waste heat from a fuel cell to heat incoming fuel in accordance with a specific embodiment.

The heat from system 10 may boil and superheat the fuel 17, depending on heat density of the heat source and fuel 17 pressure. Dissipating heat into fuel 17 also provides an additional heat sink. For example, FIG. 5B illustrates a fuel cell system 10 that uses waste heat from a fuel cell 20 to heat incoming fuel 17 in accordance with a specific embodiment. In addition to heating the incoming fuel 17, this embodiment has the advantage of using the incoming fuel to actively cool fuel cell 20. One specific embodiment of this fuel cell heating is shown in greater detail below with respect to FIG. 6B.

In many cases, fuel cell 20 takes longer than fuel processor 15 to heat up during start-up, and to achieve its minimum operating temperature. One embodiment that reduces fuel cell heating time adds an extra fuel pump, large sized fuel cell catalytic heater or fuel metering directly to the fuel cell thermal catalyst 46, which increases fuel provision to the thermal catalyst and expedites fuel cell temperature rise.

Figure 6A:
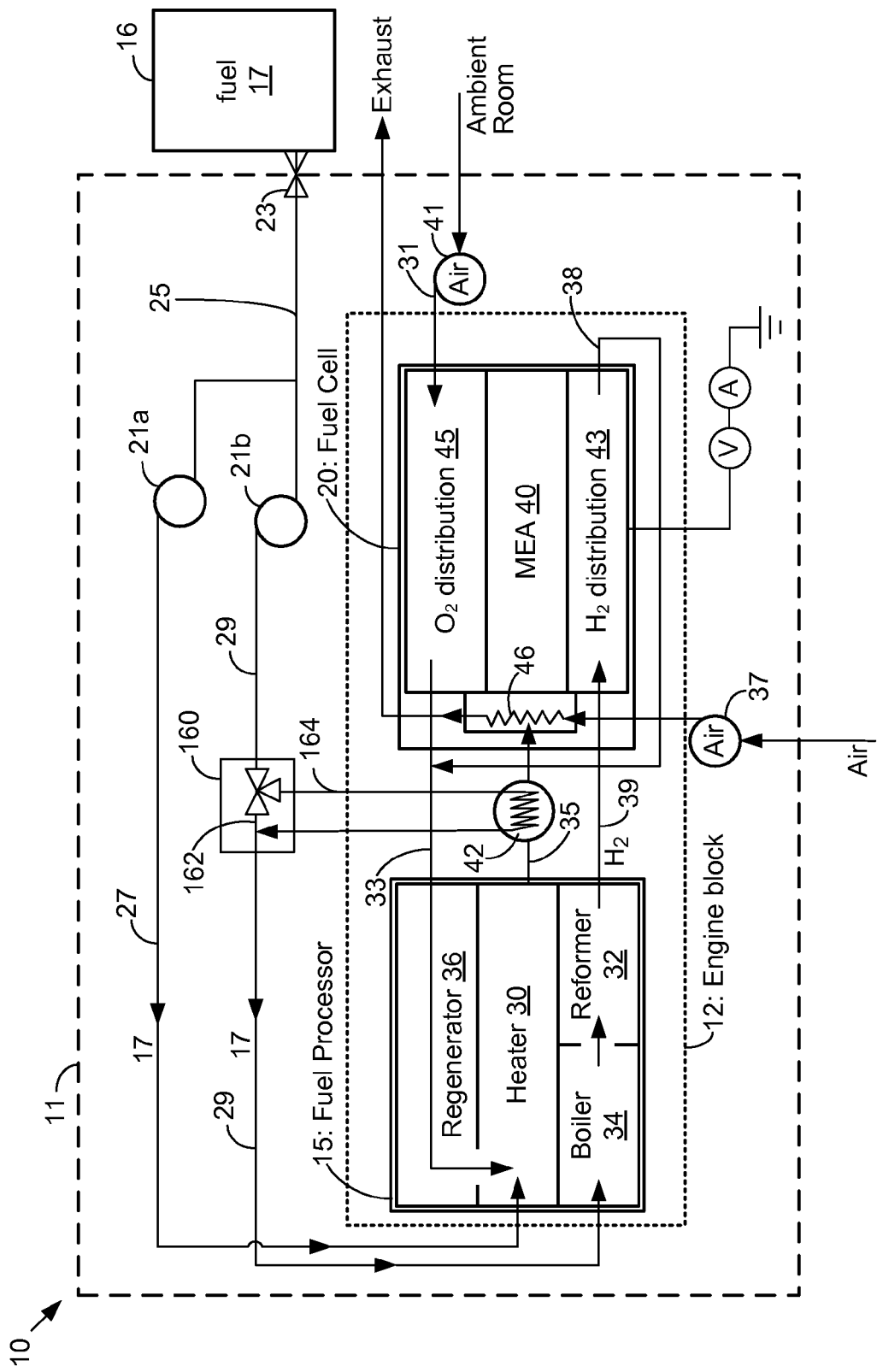
FIG. 6A shows another specific embodiment to expedite the warm-up method of FIG. 3.
Figure 6B:
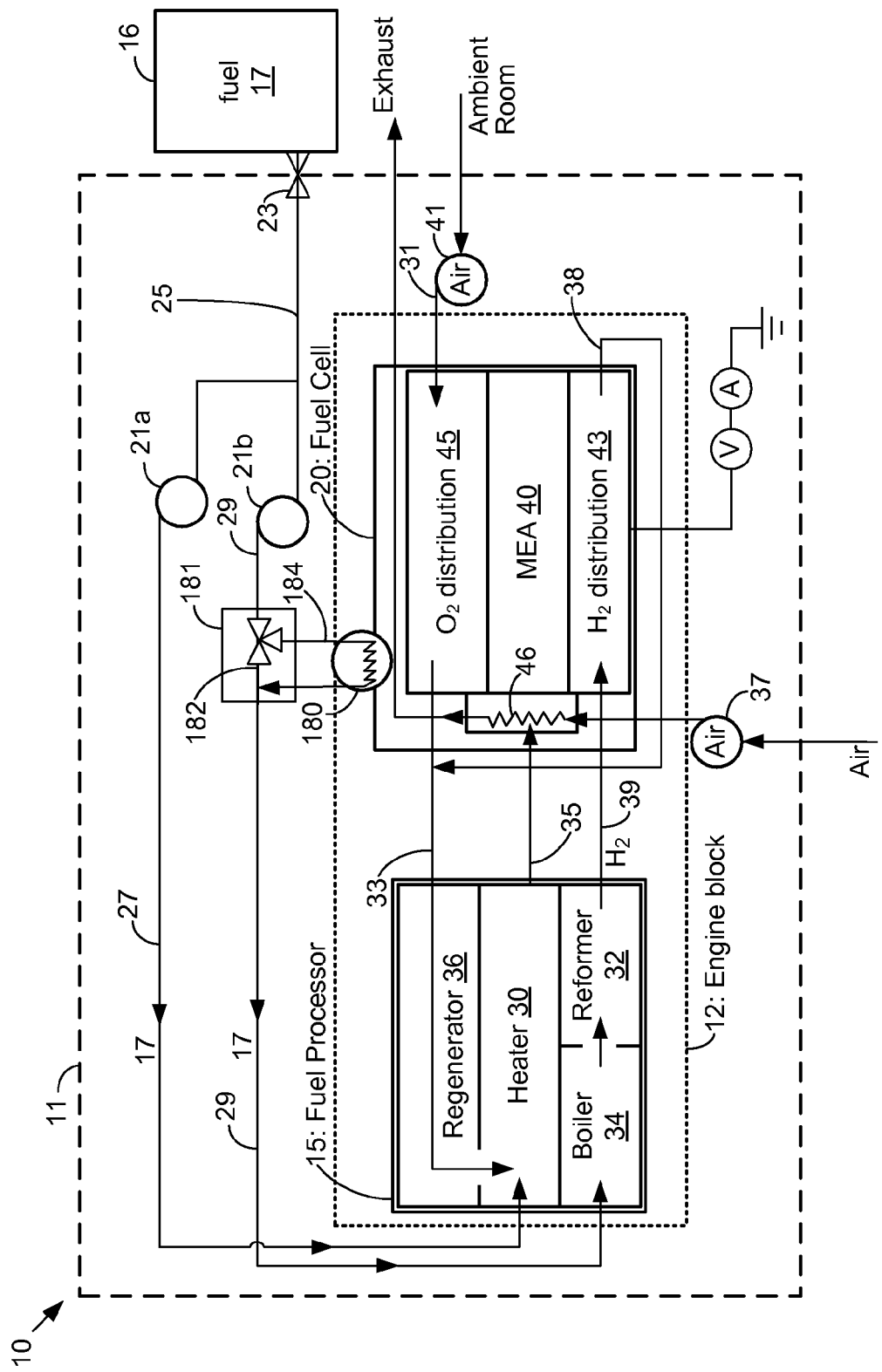
FIG. 6B shows another fuel cell system embodiment that includes a heat exchanger configured to transfer heat from a fuel cell to incoming fuel.

FIG. 6A shows another embodiment to expedite method 150 and fuel cell heating for system 10. In this case, system 10 includes an inlet fuel valve 160 configured to control fuel provision to heat exchanger 42.

Valve 160 is configured to permit two inlet fuel flow paths: 1) a first flow path 162 in which fuel 17 avoids heat exchanger 42; and 2) a second flow path 164 in which fuel 17 passes through heat exchanger 42. The first flow direction eliminates the heat transfer from the burner exhaust to the reformer fuel feed, thereby leaving more heat in the exhaust for the fuel cell. This is particularly useful during start-up when the fuel cell needs heat to reach its minimum operating temperature. The second flow path is particularly useful during steady state to cool the exhaust and to simultaneously increase system efficiency by heating incoming fuel 17. A controller associated with system 10 controls valve 160 as determined by instructions stored in software. For example, the controller may read temperatures for fuel cell 20 and fuel processor 15 and control valve 160 according to the temperature of each. In a specific embodiment, valve 160 includes a three-way or four-way valve, such as any of those commercially available from a wide variety of vendors.

System 10 may also heat the incoming fuel using heat from fuel cell 20. FIG. 6B shows another fuel cell system embodiment that includes a heat exchanger 180 configured to transfer heat from fuel cell 20 to incoming fuel 17. As shown, fuel 17 is included in line 29, which transports the fuel to reformer 32. Alternatively, heat exchanger 180 may transfer heat to line 27 or line 25, for example. Since energy production in fuel cell 20 is exothermic, heat exchanger 180 both: 1) pre-heats fuel and increases fuel processor (and overall) efficiency by reducing heat transfer to the fuel by the burner in the fuel processor, and 2) reduces surface temperature of the package 11 by using the inlet fuel as a cooling fluid for a hot fuel cell 20.

By-pass valve 181 is configured to permit two inlet fuel flow paths: 1) a first flow path 182 in which fuel 17 avoids heat exchanger 180; and 2) a second flow path 184 in which fuel 17 passes through heat exchanger 180 and receives heat from the fuel cell. The first flow path 182 eliminates the heat transfer from the fuel cell to the reformer fuel feed, as is useful during warm-up method 150 when the fuel cell needs to be heated. Flow path 184 heats fuel 17 and correspondingly cools fuel cell 20, as is useful during steady state operation and exothermic electrical energy generation. A controller associated with system 10 may then read the temperature of fuel cell 20 and control valve 181 according.

A wide variety of heat exchanging devices suitable for use herein to transfer heat from fuel cell 20 to the incoming fuel. Some were described above with respect to heat exchanger 42. Heat exchanger 180 may also include a heat pipe or heat sink system that is configured to transfer heat from the fuel cell to fuel 17. One suitable heat exchanger is a copper structure with one or more liquid heating/boiling passages that are clamped directly onto the stack heat transfer appendages, and electrically isolated by means of a thermal interface material such as Kapton coated Grafoil supplied by GrafTech of Ohio, USA. Heat from the fuel cell stack then conducts through the thermal interface material directly into the copper heat exchangers and into the fuel. In a specific embodiment, heat exchanger 180 is configured to boil the inlet fuel 17.

In another specific embodiment, a system includes both a fuel cell heat exchanger 180 (FIG. 6B) in conjunction with a heat exchanger 42 (FIG. 1B). In this manner, two separate heat exchangers are used. This may allow the reformer fuel 17 to be pre-boiled before entering the reformer (again, this increases system efficiency and reduces fuel consumption). Each heat exchanger may include its own by-pass valve 181 to permit independent control.

So far, air movement within system 10 has not been restricted by the type of pressure source. For example, pressure sources 37 and 41 may each have included a fan, a blower, compressor, etc. In another embodiment, system 10 eliminates the use of high pressure sources such as an air compressor.

Figure 7:
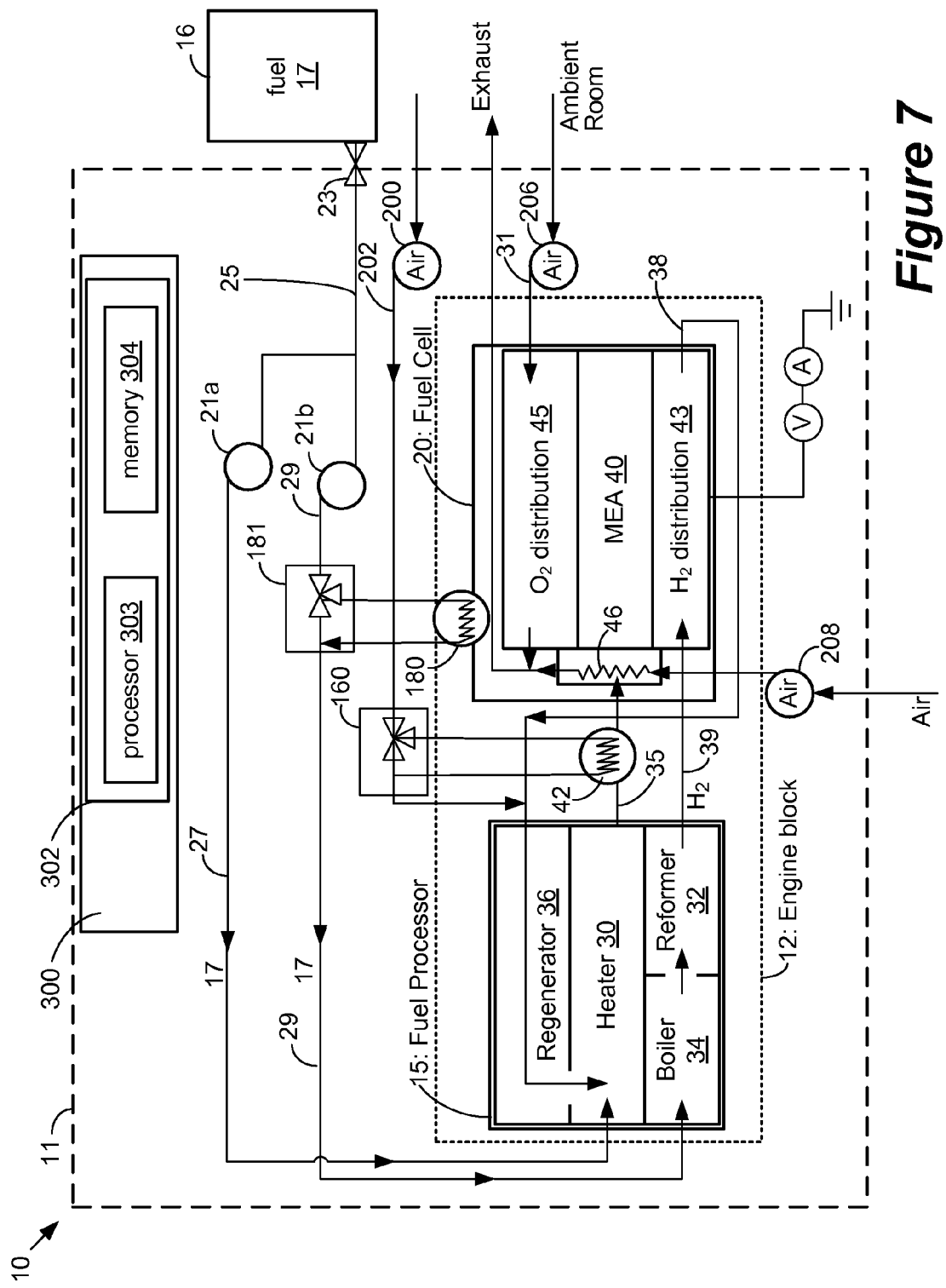
FIG. 7 shows another permutation of a portable fuel cell system that uses low pressure air sources in accordance with a specific embodiment.

FIG. 7 shows another permutation of system 10 that uses low pressure air sources 206 in place of higher pressure air sources. One advantage of the system shown in FIG. 7 is that the system uses only low pressure air sources such as a blower or fan, either of which is almost 20 decibels quieter than a standard air compressor. This quiet operation is of value to some portable fuel cell system customers.

In one embodiment, low pressure for system 10 is defined as a pressure that does not require a compressor. In a specific embodiment, low pressure is defined as less than about 50 pascals (Pa). In another specific embodiment, low pressure is defined as less than about 25 Pa. A wide variety of vendors provide blowers and fans in this pressure range. In a specific embodiment, blowers and fans in these pressure ranges, as provided by Sunon of Brea, Calif., are suitable for use with system 10. Other low pressure air sources can be added as needed. Some compact and efficient blowers are capable or providing up to 150 Pa pressure output, and these may also be used. In each case, the desired outcome is that a loud, large, heavy and expensive compressor can be substituted for a lighter, lighter, quieter and more cost effective blower or fan.

As the term is used herein, a blower refers an air-moving package that includes a side outlet relative to an axis for its motorized axis, such as one of those available from a wide variety of vendors. Since blowers, and fans, are limited to low output pressures compared to compressors of a similar size, system 10 is reconfigured to permit low pressure air sources to service the system, e.g., feed the fuel cathode, burner, and fuel cell cooling. In one embodiment, plumbing in system 10 is configured to reduce pressure losses along the fluidic path of each inlet air stream to thereby reduce pressure source needs. In another embodiment, a separate low pressure air source is used for each of the inlet air streams (cathode, burner, and cooling).

As shown in FIG. 7, a first low pressure air source 200 provides air from the ambient room into line 202, which transports the air to an inlet of regenerator 36 of fuel processor 15. Before reaching the fuel processor inlet, the air also passes through heat exchanger 42 to receive heat from the burner exhaust and to pre-heat the air before entry into regenerator 36 and burner 30. The burner exhaust then includes the air provided by low pressure air source 200.

A second low pressure air source 206 moves air from the ambient room into line 31, which then guides the air to a cathode inlet in fuel cell 20. After exiting the cathode, the heated and steam-rich air is then exhausted into the ambient room.

A third low pressure air source 208 provides air from the ambient room to fuel cell 20 for external cooling. After cooling the fuel cell, the heated air is exhausted into the ambient room.

The low pressure air sources do not come without a technical cost: control. In general, blowers and fans generally lack precision, which may create issues in a portable fuel cell system. For example, if burner 30 receives too much air (a lean fuel mixture), net heat output from the burner drops because the excess air saps heat in the burner during combustion, which necessitates a higher fuel 17 flow to compensate for the heat loss, which reduces efficiency. If the fuel mixture is too rich, a similar efficiency reduction arises in which inert fuel saps heat in the burner during combustion, and also reduces efficiency.

To permit low pressure air source usage without efficiency losses, system 10 includes heat exchanger 42 and routes the inlet burner air in line 202 or line 42 and burner exhaust in line 35 such that heat from burner 30 exhaust transfers to the air inlet (to the burner). This heat transfer and regeneration compensates for the rich and lean mixture losses and allows for more stable energy operation of the burner under rich and lean mixture conditions. In other words, the heat exchanger permits more a robust pressure source for the air—and enables lower precision control of the low pressure air source 200 without detrimental efficiency losses. In this instance, since the burner exhaust is used to preheat the incoming burner air, the inlet reformer fuel 17 is instead routed in thermal communication with a heat exchanger 180 that is configured to transfer heat from fuel cell 20 to the inlet reformer fuel 17 in line 29. Again, this is done to pre-heat the fuel 17 before it enters the reformer chamber. Similar to described above, system 10 may use of one or more by-pass valves 160 and 181, as described above, during warm-up or steady state operation to control when heat transfers from the fuel cell.

Figure 8:
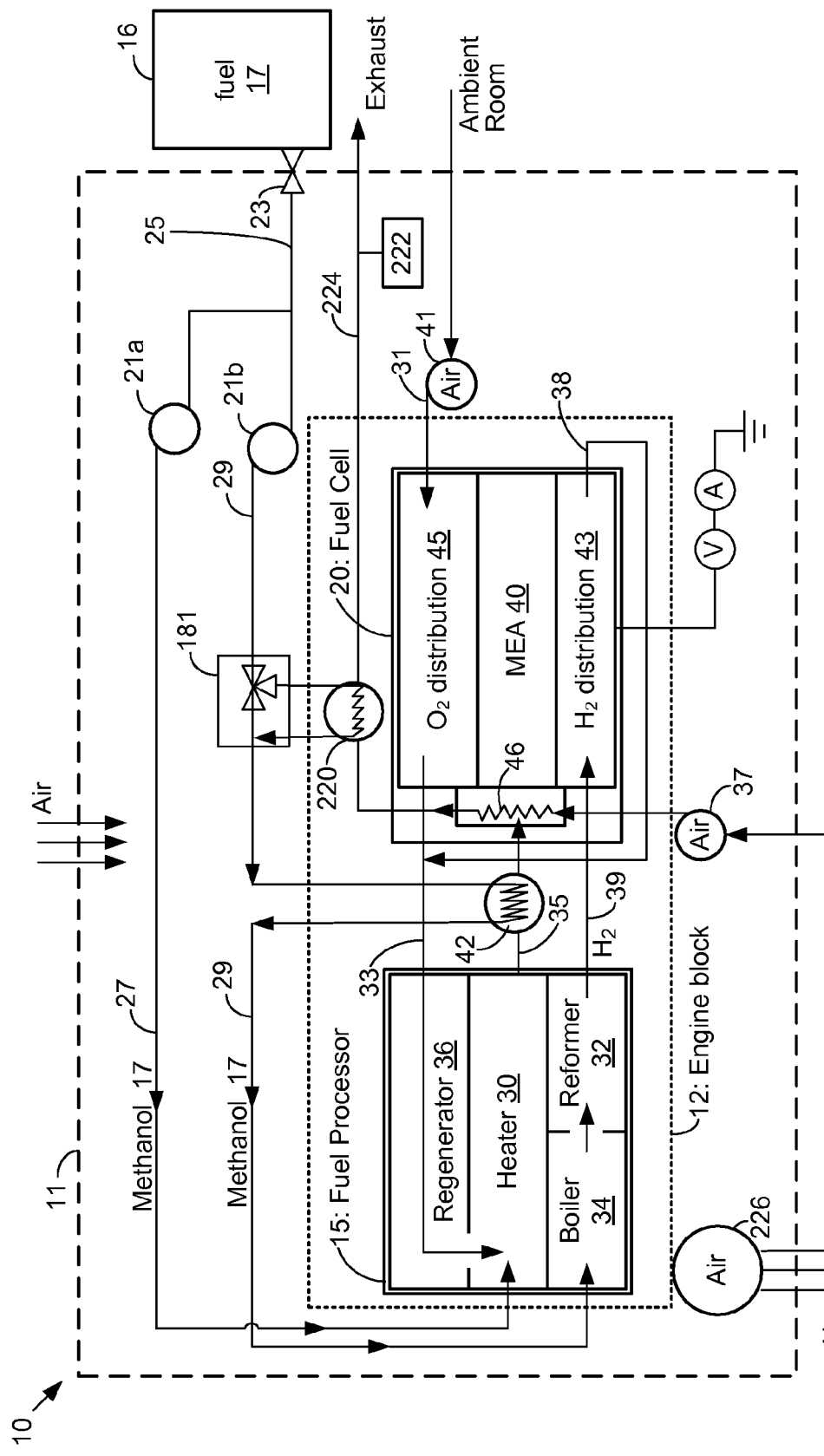
FIG. 8 shows a portable fuel cell system with exhaust controls in accordance with another embodiment.

The portable fuel cell system as described herein may also manipulate exhaust emissions in some embodiments. FIG. 8 shows system 10 with exhaust controls in accordance with another embodiment.

This system design uses another heat exchanger 220, or intercooler, which is configured to preheat the inlet reformer fuel 17 using waste heat in the burner exhaust. In one embodiment, this heat exchange occurs before the burner exhaust mixes with another exhaust stream from the system, such as air moved by fuel cell coiling fan 37 or air provided by system fan 226. System fan 226 is configured as a large fan to generally cool the internal enclosure for package 11. In a specific embodiment, system fan 226 is configured to draw air from the internal cavity of package 11 instead of blowing air into the cavity. This pulls air out of the package, and out of the room and into the package via any inlet cooling ports, which may be disposed in one or more portions of the package to achieve a desired general flow in the package. Since the burner exhaust typically includes the highest temperature of the exhaust air outlets, arranging heat exchanger 220 before any dilution increases heat transfer to the fuel 17, which increases fuel processor and system efficiency.

As shown, heat exchanger 220 is physically included in engine block 12. In other specific embodiments, the heat exchanger is external to the engine block 12. By-pass valve 181 permits heat exchanger 220 to be controllably used by a system controller.

As shown, the system 10 in FIG. 8 also includes a heat exchanger 42. Thermodynamically, intercooler 220 and heat exchanger 42 share a similar function: to heat incoming fuel. In a specific embodiment, heat exchanger 42 is configured to boil the fuel 17 since the burner exhaust at heat exchanger 42 is at a higher temperature than intercooler 220 (higher quality input heat in a heat exchanger typically leads to a more controllable secondary fluid boil). Theoretically, the intercooler 220 may not have a net reduction in the exhaust temperature if a heat exchanger 42 is used in the burner exhaust upstream from the heat exchanger 220. However, practical heat loss considerations make the intercooler useful. For example, if there is significant heat loss off the heat exchanger, then there may not be enough heat in the burner exhaust stream to fully boil the fuel 17, depending on the temperature of the burner, the burner exhaust, and design of the system. However, if the fuel 17 is already pre-heated to a single phase vapor using intercooler 220, or two-phase liquid vapor state, then the heat exchanger 42 has sufficient heat to ensure that the fuel stream is fully boiled, and maybe even superheated before it enters the reformer.

Other configurations may also be used with heat exchanger 220. In one specific embodiment, system 10 does not include heat exchanger 42 and relies on heat exchanger 220 to at least partially pre-heat the incoming fuel 17. In another specific embodiment, system 120 uses a combination of heat exchanger 220 on the burner exhaust and a heat exchanger 180 that draws heat from fuel cell 20.

Notably, a second function of heat exchanger 220 is to cool the system exhaust. A sensor 222 may be coupled to the exhaust line 224 to measure one or more physical or chemical properties of the system exhaust. In a specific embodiment, sensor 222 is configured to measure temperature of the system exhaust. In another specific embodiment, sensor 222 is configured to carbon monoxide levels in the system exhaust.

Figure 9:
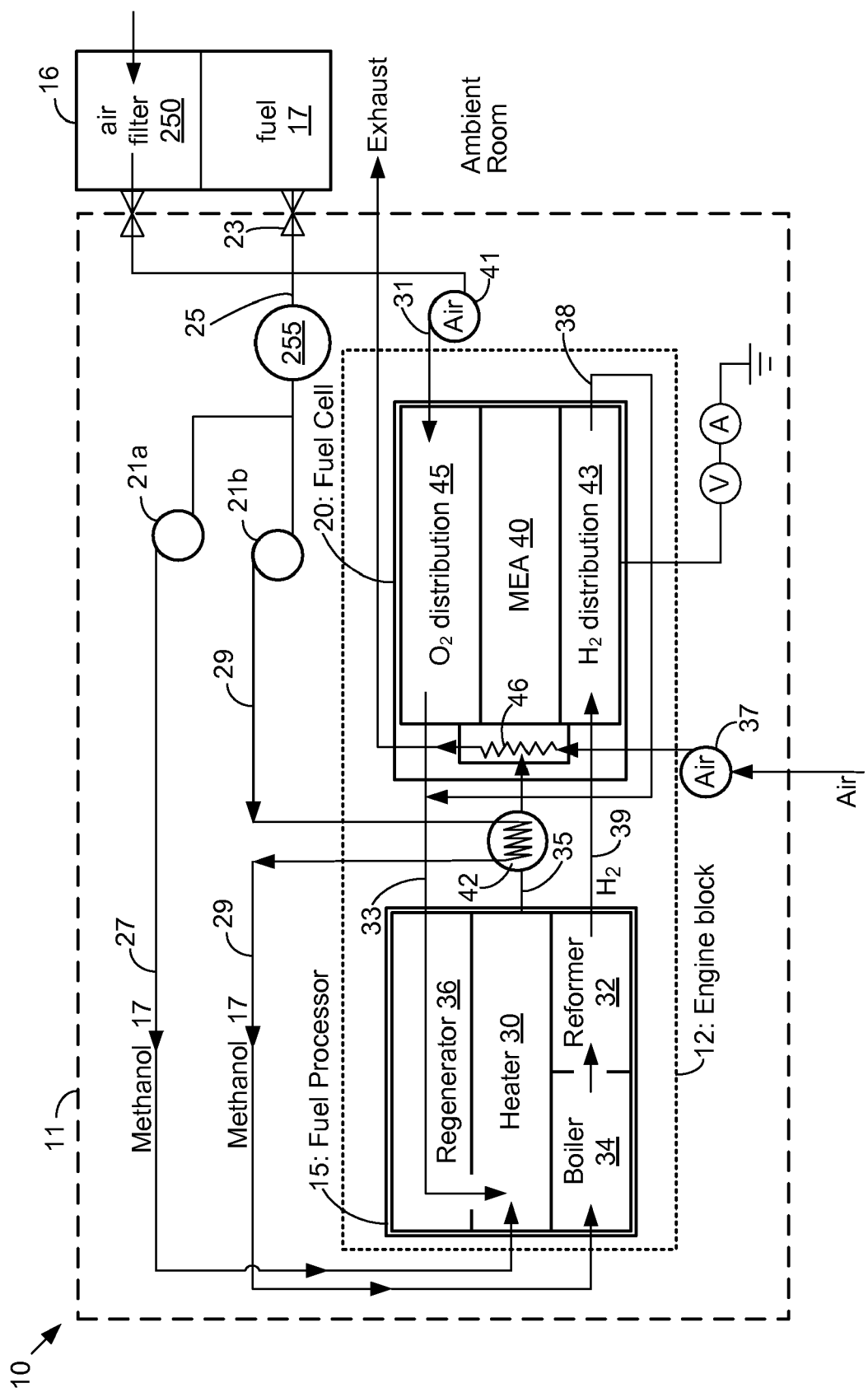
FIG. 9 shows another system embodiment that includes increased interface with a fuel storage device.

FIG. 9 shows another portable fuel cell system embodiment that includes increased interface with storage device 16. In this embodiment, storage device 16 includes an air filter 250 configured to intercept inlet air before the portable fuel cell system 10 receives the air. Filter 250 is positioned such that air leading into the fuel cell package 11 first passes through the filter before entering the package.

Filter 250 is configured to remove particulates and substances from an inlet air stream. This may be done for: the inlet air provided to the cathode of fuel cell on line 31, the inlet air provided to the fuel processor in line 202 of FIG. 7, the fuel cell cooling air moved by fan 37, and/or a general system fan arranged to cool the interior package. Filtration demands of the inlet stream will affect filter selection. For example, cooling airflow needs less stringent filtration than process gas airflow fed into a fuel cell, fuel processor, burner 30, or another chemical reactor. The material used in filter 250 is typically selected based on the undesirable particulates and substances that a system designer wants to remove from the inlet air stream. In a specific embodiment, particulates and substances captured by filter 250 include any contaminant that may damage a fuel cell system or affect fuel cell system performance. For example, such contaminants include those that may damage a cathode or affect a cathode catalyst used in the fuel cell, or those that may affect a catalyst included in a reformer or burner in the fuel processor. Specific examples include: dust, dirt, smoke, sand, liquids such as water or an oil, soot particles, cordite or other explosives residue, pet dander, carpet fibers, pollen, etc. In one embodiment, filter 250 includes a micron or submicron particulate filter that includes one or more layers of a filter material. Air filter 250 may be divided into one or more sections, each section optimized to filter a certain particle size or impurity based on the direction in which the air is to be directed. Filters suitable for use herein are commercially available from a wide variety of vendors. Water, for example, could be filtered using Goretex or a similar material that blocks water while allowing air to pass through. One suitable air filter for capturing dust is supplied by Small Parts Inc. Part number: CMP-0297-D, (297 micron Polypropylene). Methods using system 10 of FIGS. 4A-4C may correspondingly include passing air through the air filter 17 to produce filtered air, and providing the filtered air from the air filter 17 on the portable fuel cartridge 16 to the fuel cell system.

The system of FIG. 9 also includes a hot swap reservoir 255 that stores a small volume of fuel 17. Notably, reservoir 255 stores fuel 17 when storage device 16 is disconnected. This enables system 10 for 'hot swappable' capability. Hot swapping of storage device 16 refers to removing storage device 16 from package 11, without shutting down system 10 or without compromising hydrogen fuel source provision to fuel processor for a limited time, until another storage device 16 is coupled back to the system.

The time that a receiving fuel processor 15, system 10 or electronics device may be operated for while storage device 16 is separated relates to the amount of fuel in reservoir 255 and the rate at which fuel 17 is consumed. In one embodiment, reservoir 255 includes a maximum volume between about 1 milliliter and about 50 milliliters. A maximum volume between about 1 milliliter and about 4 milliliters may be suitable for some portable electronics applications.

As mentioned above for 150a in FIGS. 3 and 4A, fuel processor 15 may employ one or more techniques to help boil fuel during start-up. A technical challenge in portable fuel cell systems is igniting a fuel source at ambient temperature during start-up. Several options are available: a spark plug type igniter for gaseous fuels, a resistive element for liquid fuels, or a combination of the preceding two options with a catalyst.

The inventors have discovered difficulties with each of these options. First, in each of these cases, electrical connections are made between the heating zone internal to the fuel processor and the electrical control system. Since the electrical control system is typically located outside a heating zone internal to the fuel processor, gas-sealing is needed for the electrical interface between the internal heating zone and external ambient air. Second, when the fuel processor uses metallic parts, the electrical connection passes through one or more electrically conductive walls or bulkheads (i.e., a fuel processor dewar 36 with metal walls) and hence the electrical interface is further complicated by a need to provide electrical isolation between the electric conductors of a resistive heater, the seal and the metal bulkheads. Third, a method of heat isolation is often needed to ensure that the heat generated is released at the intended heating zone, and not inadvertently released at a metal bulkhead, thermal interface, gas seal interface, or some other unintended location.

Figure 10A:
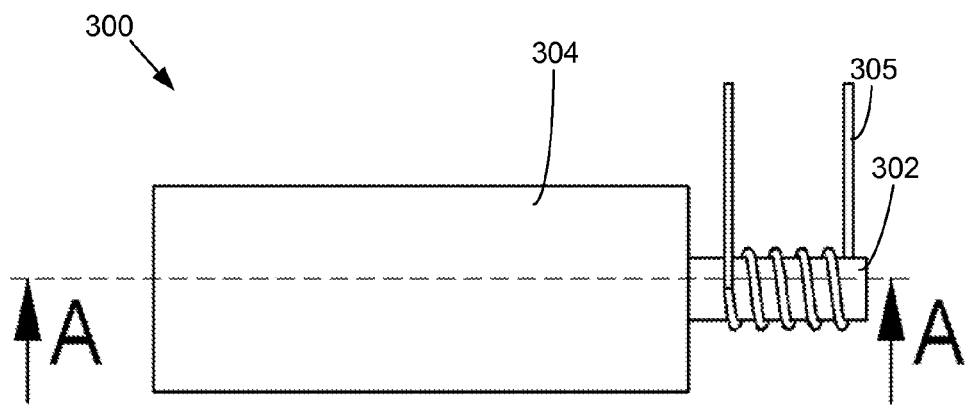
FIGS. 10A and 10B show an ignition device suitable for use with a portable fuel cell system in accordance with another embodiment.
Figure 10B:
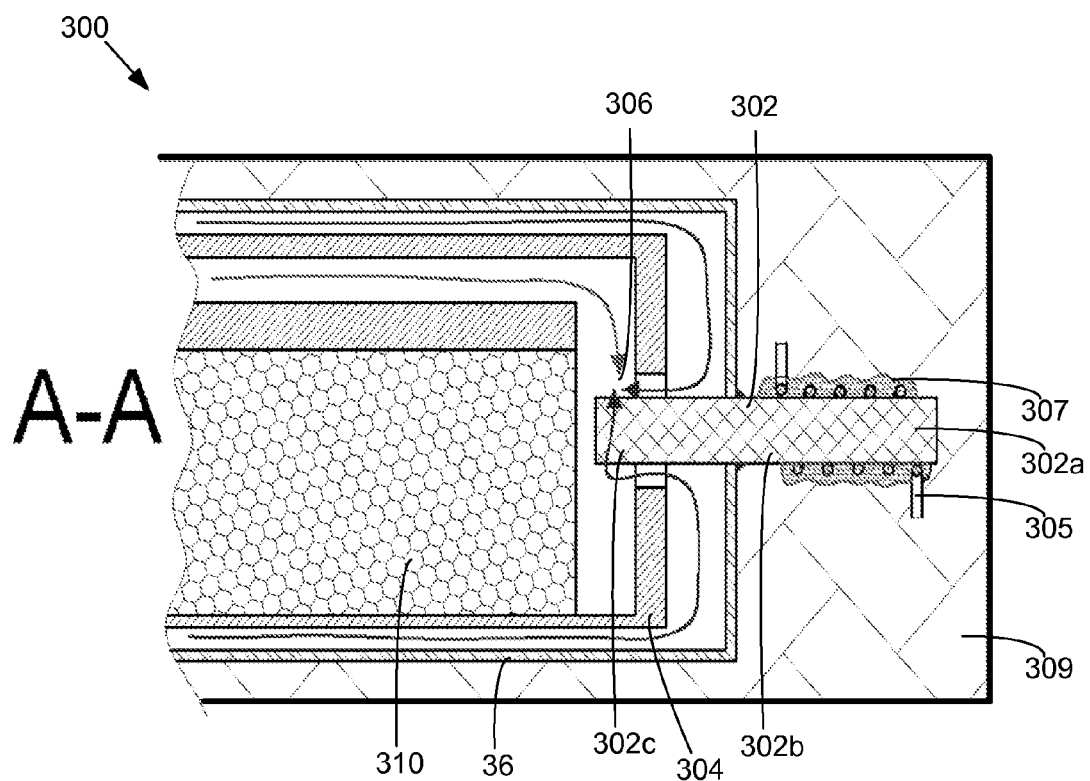

FIGS. 10A and 10B show an ignition device 300 suitable for use with a portable fuel cell system in accordance with another embodiment. Ignition device 300 solves the above-mentioned issues. Ignition device 300 includes a thermal conductor 302 and heating element 305.

Thermal conductor 302 includes a first portion 302a mechanically coupled to heating element 305, a second portion 302b that passes through wall 304, and a third portion 302c with one or more surfaces that open to a heating zone 306. Thermal conductor 302 may includes any material with a high thermal conductance, such as copper or another metal. Wall 304 is a wall or bulkhead of fuel processor 15 that separates an external portion from an internal portion of the fuel processor proximate to where combustion occurs. A fluidic seal is applied at the interface between central portion 302b and wall 304. Heating zone 306 may include an intersection of liquid fuel and air at an inlet to burner 30. Other locations of fuel processor may be used.

Central portion 302b of thermal conductor 302 attaches to the wall 304 of fuel processor 15. In a specific embodiment, conductor 302 is bonded to the bulkhead using laser welding, brazing, or another suitable metal joining technique. The actual amount of connection between central portion 302b and wall 304 is small, which reduces heat transfer into the wall.

A resistive heating element 305 produces heat when current passes therethrough. In one embodiment, heating element 305 includes a wire, such as a Kanthal-D or Ni—Cr wire, wrapped, mechanically attached, or otherwise bonded, to conductor 302 at external portion 302a, outside of any oxygen or fuel cavities. Heat conduction between the external portion 302a of conductor 302 and heating element 305 may be enhanced through the use of a thermal interface material that bonds heating element 305 to external portion 302a, such as alumina or silica-based electrically insulating thermal adhesives for example. Electrical isolation between the heating element 305 and the conductor 302 may be enhanced through the use of a thin electrically insulating interlayer 307 that prevents heat escape from external portion 302a and heating element 305, such as copper oxide or alumina for example. In a specific embodiment, heating element 305 and external portion 302a of conductor 302a are also packaged within thermal insulation 309 that surrounds the fuel processor 15. The thermal insulation 309 reduces heat loss from fuel processor 15 to the ambient environment, and in this case, also reduces heat loss from external portion 302a.

In operation, when a potential is applied across the heating element 305, the heating element 305 heats up, and heat transfers into the external portion 302a of conductor 302. The heat then conducts through the conductor 302 to the internal portion 302c of conductor 302 at heating zone 306. When fuel 17 comes into contact with a surface of conductor 302, the fuel vaporizes, and the vaporized fuel mixes with the air to present a flammable gas mixture to a catalytic bed 310 in the heater 310. In the heater, the vaporized fuel ignites, and the fuel processor 15 heats up. Once the heat release rate of the burning gas mixture reaches self-sustaining levels (e.g., after 5-30 seconds, depending on the thermal mass of the fuel processor, the fuel composition, and inlet flow rates, for example), the heating element 305 can be turned off. In this manner, very high heat loads (1-100 W/cm$^2$) can be generated. In a specific embodiment, ignition device 300 consumes between about 1 watt and about 40 watts. In another specific embodiment, ignition device 300 consumes between about 10 watts and generates about 750 W/m$^2$ at the internal surface on internal portion 302c. Notably, ignition device 300 also permits high operating temperatures. For example, device 300 may be used as an ignition source for a high temperature fuel such as diesel, and still offer good sealing capability at high reforming temperatures (e.g., near 600 degrees Celsius)

In another specific embodiment to expedite startup, a conductor volume located at the heating zone 306 is coated with a catalyst. When conductor 302 is heated externally, the catalyst in the vicinity of the heating zone rapidly heats up, leading to even shorter startup times.

Figure 11A:
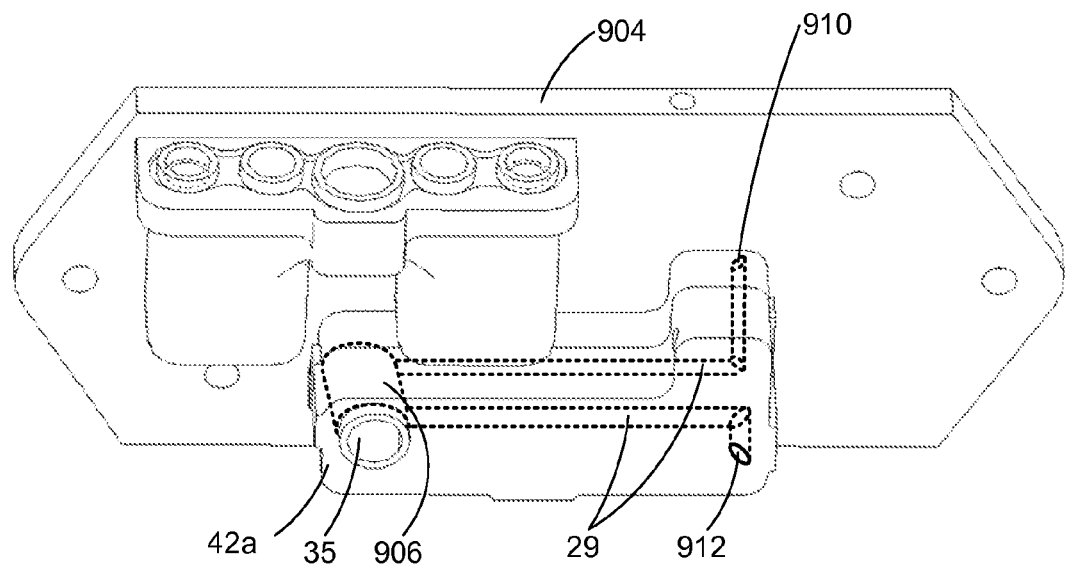
FIGS. 11A-11C show three exemplary heat exchangers that heat an incoming fuel in accordance with three specific embodiments.
Figure 11B:
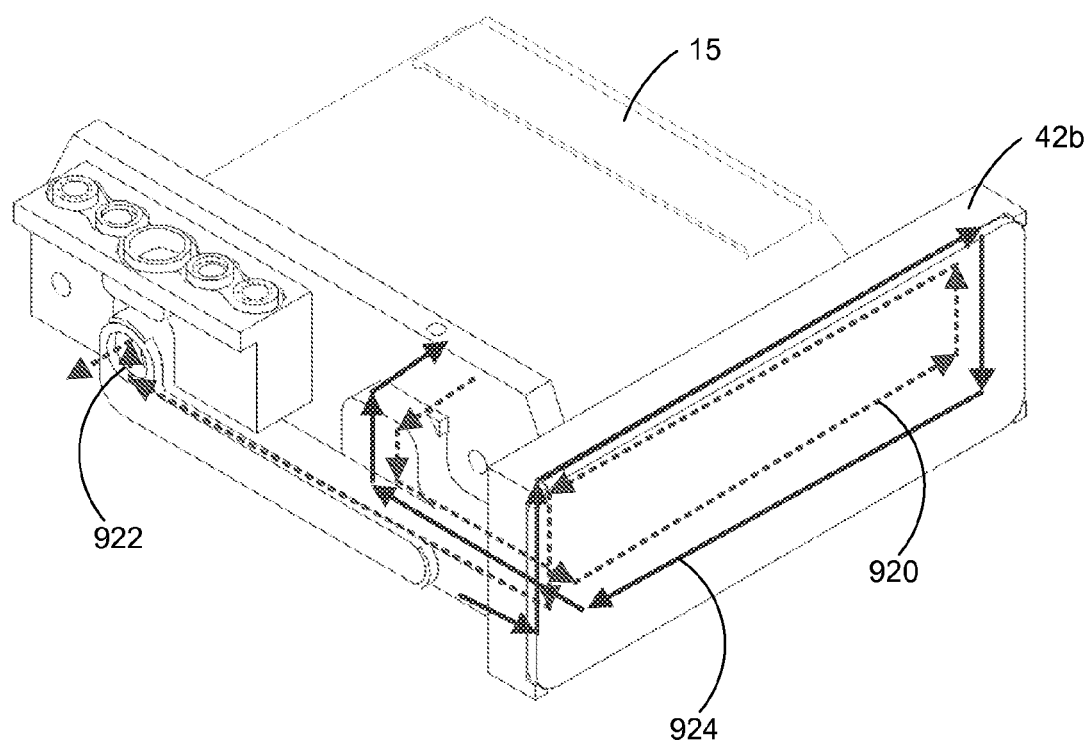
Figure 11C:
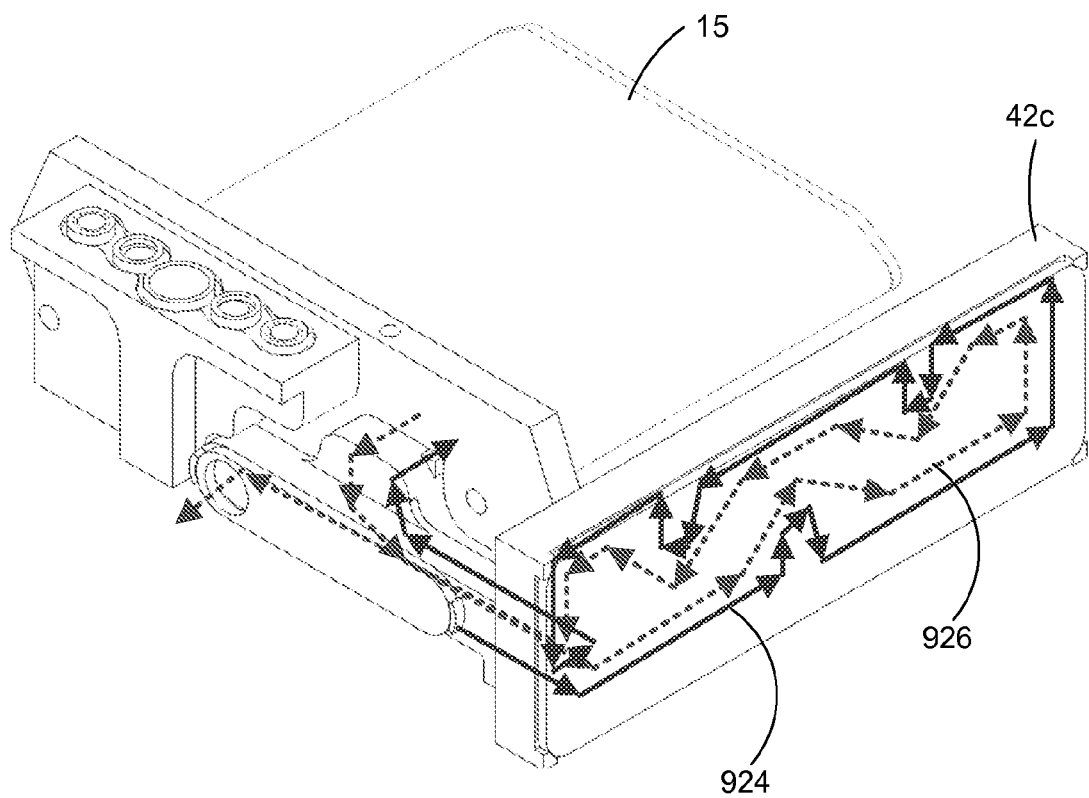

A wide variety of heat exchanging devices are suitable for use herein to transfer heat from a hot fluid in system 10 to the incoming fuel. FIGS. 11A-11C show three custom heat exchangers 42a-42c, respectively, in accordance with specific embodiments that are suitable for use with a portable fuel cell system package.

Heat exchanger 42a attaches to a wall 904 disposed between fuel cell 20 and fuel processor 15 that faces fuel cell 20. Line 29 carries the fuel from storage device 16 (FIG. 1B) and enters heat exchanger 42a at hole 912. The fuel then travels through heat exchanger 42a to a high-surface area portion 906 of line 29 in heat exchanger 42a. Portion 906 wraps around line 35 and provides a large surface area for thermal interaction with the walls of line 35. As shown in FIG. 1B, line 35 transports the burner exhaust from fuel processor 15 to fuel cell 20. Heat in the burner exhaust thus: a) convects from the burner exhaust to the walls of line 35, conducts through the walls of heat exchanger 42a to the walls of high-surface area portion 906, and c) convects from the walls of high-surface area portion 906 into the fuel in line 29. The heated fuel then continues through line 29 to hole 910 for further transport to an inlet of the fuel processor.

If the operating temperature of heat exchanger 42a is less than an adjacent fuel cell or fuel processor, then the heat exchanger may sink heat from the warmer structures and reduce efficiency. FIG. 11B shows a heat exchanger 42b that is physically separated from the fuel processor 15, which reduces heat transfer and loss from the fuel processor 15 to the heat exchanger 42b. Situating heat exchanger 42b in a space that is not between fuel cell 20 and fuel processor 15 also permits a larger heat exchanger 42b.

The larger heat exchanger 42b also permits longer flow paths for the burner exhaust and inlet fuel, which provides more time for heat transfer. Burner exhaust, shown by dotted line 920 in FIG. 11B, starts at an exit of the burner in fuel processor 15 and linearly runs the length of heat exchanger 42, twice, before routing back to port 922, which opens to the thermal catalyst used to heat the fuel cell. The inlet fuel path, shown by dotted line 924, starts at a fuel inlet and linearly runs the length of heat exchanger 42, twice, before provision into the burner inlet (internal and not shown) of fuel processor 15. In this case, gas in burner exhaust 920 runs counterflow to fuel in fuel path 924.

Heat exchanger 42c (FIG. 11C) is similar to heat exchanger 42b except that it includes non-linear plumbing 926, in the heat exchanger, that transports the reformer fuel or the burner fuel. As shown, the plumbing in heat exchanger 42c follows a curved flow path for both burner exhaust 920 and fuel path 924, which permits longer flow paths for the burner exhaust and inlet fuel and further improves heat transfer from the exhaust to the fuel.

While the fuel cell systems and methods have so far been described with respect to physical components and methods for those physical components, the embodiments described herein also apply to logic and control schemes for controlling components of a portable fuel cell system.

In one embodiment, the control scheme uses a combination of a processor and logic stored in a memory. FIG. 7 shows one embodiment of an onboard control board 300 that includes a processor system with a processor 302 and memory 304.

Processing system 302, or controller 302, is designed or configured to execute one or more software applications that control one or more components in system 10. In addition, processing system 302 may be designed or configured to execute software applications that allow control one or more components in system. Processing system 302 includes processor 303 and memory 304.

Processor 303 may include any commercially available logic device known to those of skill in the art. For example, processor 303 may include a commercially available microprocessor such as one of the Intel or Motorola family of chips or chipsets, or another suitable commercially available processor. Processor 303 may digitally communicate with memory 304 via a system bus, which may comprise a data bus, control bus, and address bus for communication between processor 303 and memory 304.

Memory 304 also stores logic and control schemes for methods describer herein. The logic and control schemes may be encoded in one or more tangible media for execution and, when executed, operable to warm up or operate a fuel cell system at steady state as described herein. In one embodiment, the fuel cell system methods are automated. A user may initiate system operation by turning on a power button for the system, and all steps are automated until power production begins. Because such information and program instructions may be employed to implement the systems/methods described herein, the present invention relates to machine-readable media that include program instructions, state information, etc. for performing various operations described herein. Examples of tangible machine-readable media include, but are not limited to, magnetic media such as hard disks, floppy disks, and magnetic tape; optical media such as CD-ROM disks; magneto-optical media such as floptical disks; and hardware devices that are specially configured to store and perform program instructions, such as read-only memory devices (ROM) and random access memory (RAM). Examples of program instructions include both machine code, such as produced by a compiler, and files containing higher level code that may be executed by the computer using an interpreter. The invention may also be embodied in a carrier wave traveling over an appropriate medium such as airwaves, optical lines, electric lines, etc.

While fuel cell systems have mainly been discussed so far with respect to a reformed methanol fuel cell (RMFC), embodiments described herein may also apply to other types of fuel cells, such as a solid oxide fuel cell (SOFC), a phosphoric acid fuel cell (PAFC), a direct methanol fuel cell (DMFC), or a direct ethanol fuel cell (DEFC). In this case, fuel cell 20 includes components specific to these architectures, as one of skill in the art will appreciate. A DMFC or DEFC receives and processes a fuel. More specifically, a DMFC or DEFC receives liquid methanol or ethanol, respectively; channels the fuel into the fuel cell stack and processes the liquid fuel to separate hydrogen for electrical energy generation. For a DMFC, channel fields in the bi-polar plates distribute liquid methanol instead of hydrogen. A hydrogen catalyst would then comprise a suitable anode catalyst for separating hydrogen from methanol. The oxygen catalyst would comprise a suitable cathode catalyst for processing oxygen or another suitable oxidant used in the DMFC, such as peroxide. In general, the hydrogen catalyst is also commonly referred to as an anode catalyst in other fuel cell architectures and may comprise any suitable catalyst that removes hydrogen for electrical energy generation in a fuel cell, such as directly from the fuel as in a DMFC. In general, the oxygen catalyst may include any catalyst that processes an oxidant in used in fuel cell 20. The oxidant may include any liquid or gas that oxidizes the fuel and is not limited to oxygen gas as described above. An SOFC, PAFC or MCFC may also benefit from inventions described herein, for example. In this case, fuel cell 20 comprises an anode catalyst, cathode catalyst, anode fuel and oxidant according to a specific SOFC, PAFC or MCFC design.

While this invention has been described in terms of several preferred embodiments, there are alterations, permutations, and equivalents that fall within the scope of this invention which have been omitted for brevity's sake. For example, while ignition device 300 and many other system designs described herein are described in the context of a reformed methanol fuel cell (RMFC), the embodiments may each find use in other fuel cell systems such as SOFC, hydrocarbon reformed systems, ammonia based fuels, etc. In addition, heating systems have been described with respect to fuel cells that include heat transfer appendages. Further, while fuel cell systems were described with respect to including a regenerator and other system parts, many of these components are not necessary for a fuel cell system and may be omitted from various embodiments. It is understood that the fuel cells need not include one or more heat transfer appendages to benefit from heating transfer techniques described herein. It is therefore intended that the scope of the invention should be determined with reference to the appended claims.

What is claimed is:

1. A portable fuel cell system for producing electrical energy comprising:
   a fuel cell system disposed within a portable package having:
   (i) a fuel processor that includes
      a reformer configured to receive fuel and to output hydrogen using the fuel, and
      a burner configured to process fuel to generate heat;
   (ii) a fuel cell configured to produce electrical energy using hydrogen output by the reformer;
   (iii) at least one line, internal to the portable package, configured to transport reformer fuel to the reformer;
   (iv) at least one line, internal to the portable package, configured to transport burner fuel to the burner; and
   (v) a heat exchanger disposed between the fuel processor and the fuel cell and wherein the heat exchanger is at least partially coupled to the fuel cell to conductively transfer heat from the fuel cell to the reformer fuel or to the burner fuel.

2. The fuel cell system of claim 1 wherein the heat exchanger includes at least one line that transports a fluid that includes the heat generated in the fuel cell or generated in the fuel processor.

3. The fuel cell system of claim 2 wherein the fluid includes burner exhaust from the fuel processor.

4. The fuel cell system of claim 3 wherein the fuel cell is configured to receive the burner exhaust from the fuel processor.

5. The fuel cell system of claim 4 further comprising a valve configured to controllably prevent the reformer fuel or the burner fuel from reaching the heat exchanger.

6. The fuel cell system of claim 1 further comprising a valve configured to control the flow of the reformer fuel or the burner fuel so that the fuel avoids contact with the heat exchanger.

* * * * *